United States Patent [19]

Nishio

[11] Patent Number: 5,991,010
[45] Date of Patent: Nov. 23, 1999

[54] IMAGE READING APPARATUS

[75] Inventor: Tomonori Nishio, Kanagawa, Japan

[73] Assignee: Fuji Photo Film Co., Ltd., Kanagawa, Japan

[21] Appl. No.: 09/137,818

[22] Filed: Aug. 21, 1998

[30] Foreign Application Priority Data

Aug. 22, 1997 [JP] Japan .................................. 9-226456
Sep. 3, 1997 [JP] Japan .................................. 9-238673

[51] Int. Cl.$^6$ ............................ G03B 27/04; G03B 27/52
[52] U.S. Cl. ................................ 355/82; 355/40; 355/41
[58] Field of Search ................................ 355/27, 29, 40, 355/41, 38, 39, 43, 82, 37, 46; 399/206

[56] References Cited

U.S. PATENT DOCUMENTS

| | | | |
|---|---|---|---|
| 5,515,136 | 5/1996 | Nishio et al. | 355/37 |
| 5,550,613 | 8/1996 | Hasegawa et al. | 355/41 |
| 5,561,743 | 10/1996 | Kanai et al. | 395/107 |
| 5,719,540 | 2/1998 | Takaoka et al. | 355/35 |
| 5,745,220 | 4/1998 | Okazaki et al. | 355/54 |

FOREIGN PATENT DOCUMENTS

| | | |
|---|---|---|
| 58-9145 | 1/1983 | Japan . |
| 6-242521 | 9/1994 | Japan . |
| 6-242522 | 9/1994 | Japan . |
| 8-304932 | 11/1996 | Japan . |
| 8-304933 | 11/1996 | Japan . |
| 8-304934 | 11/1996 | Japan . |
| 8-304935 | 11/1996 | Japan . |

*Primary Examiner*—Safet Metjahic
*Assistant Examiner*—Hung Henry Nguyen
*Attorney, Agent, or Firm*—Birch, Stewart, Kolasch & Birch, LLP

[57] ABSTRACT

The amount of light emitted from a lamp is adjusted by a turret and a diaphragm for each light of the component colors and is irradiated on a photographic film via a light diffusion box. Light transmitted through the photographic film is made incident on a three-line CCD via a lens unit. In order to read a film image, first, the photographic film is conveyed at high speed in a predetermined direction and is read under a predetermined reading condition (pre-scan), and based on image data obtained by the reading, a recorded position of each image is determined and a reading condition during fine scan is calculated for each image, and each image is read under the calculated reading condition while the film is conveyed at relatively low speed in a direction opposite to the predetermined direction (fine scan).

19 Claims, 25 Drawing Sheets

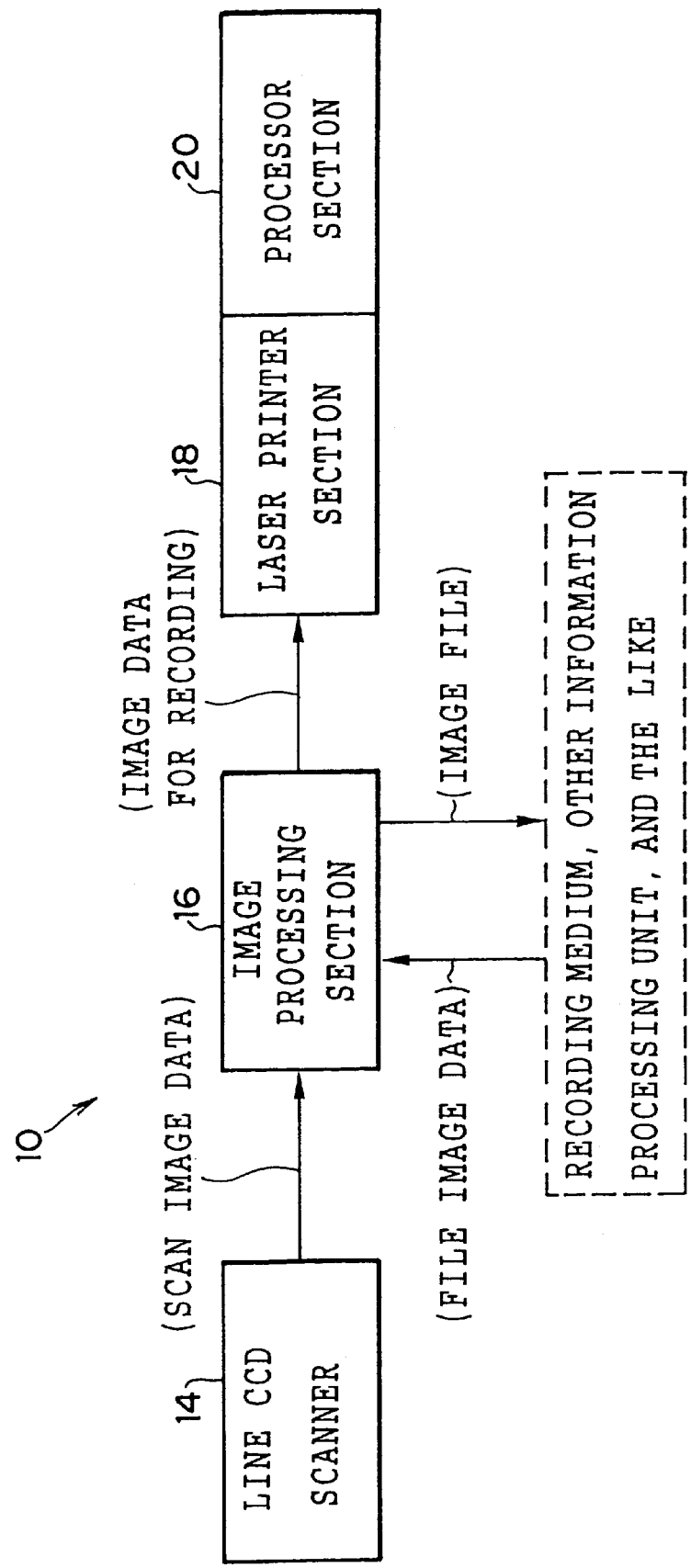

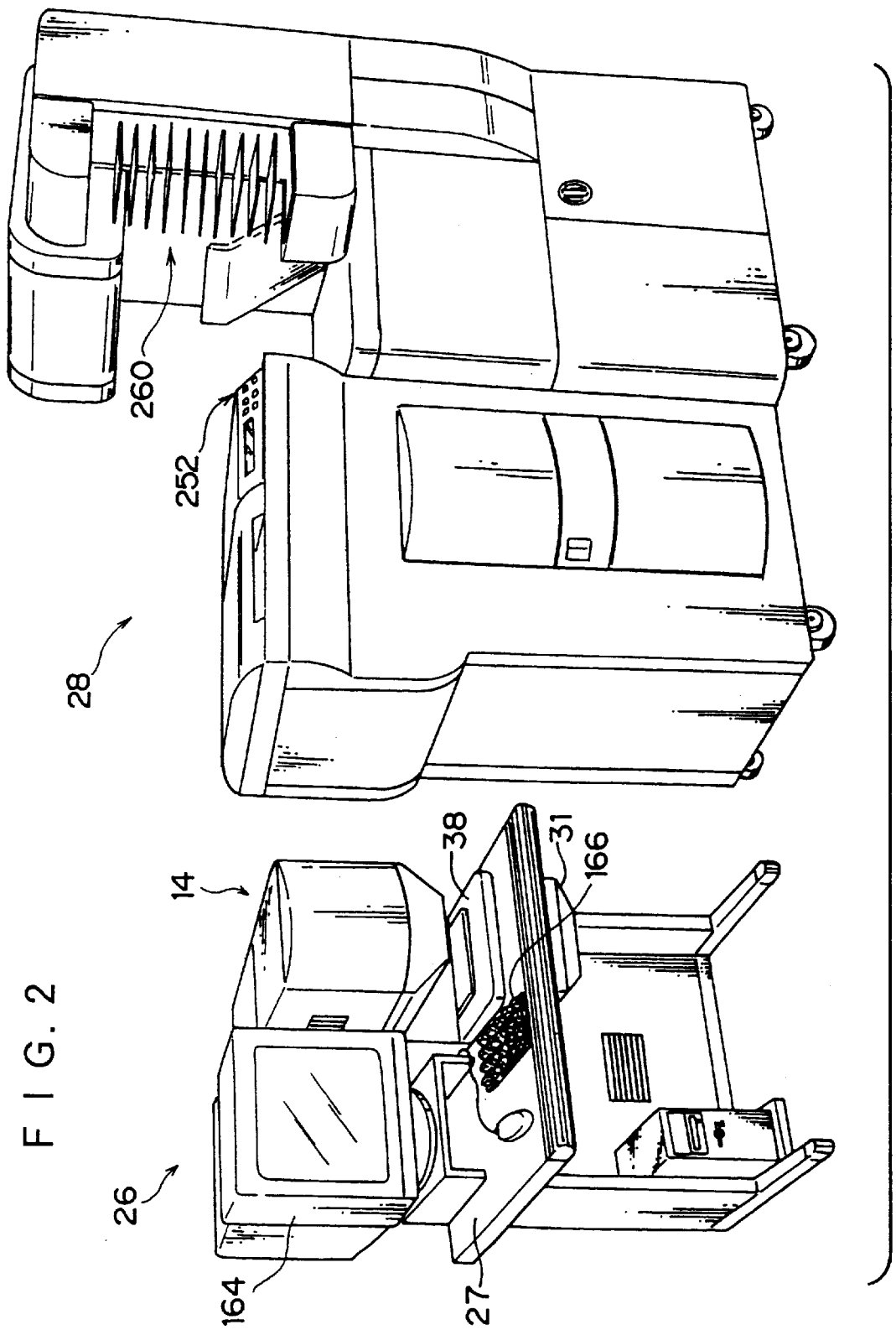

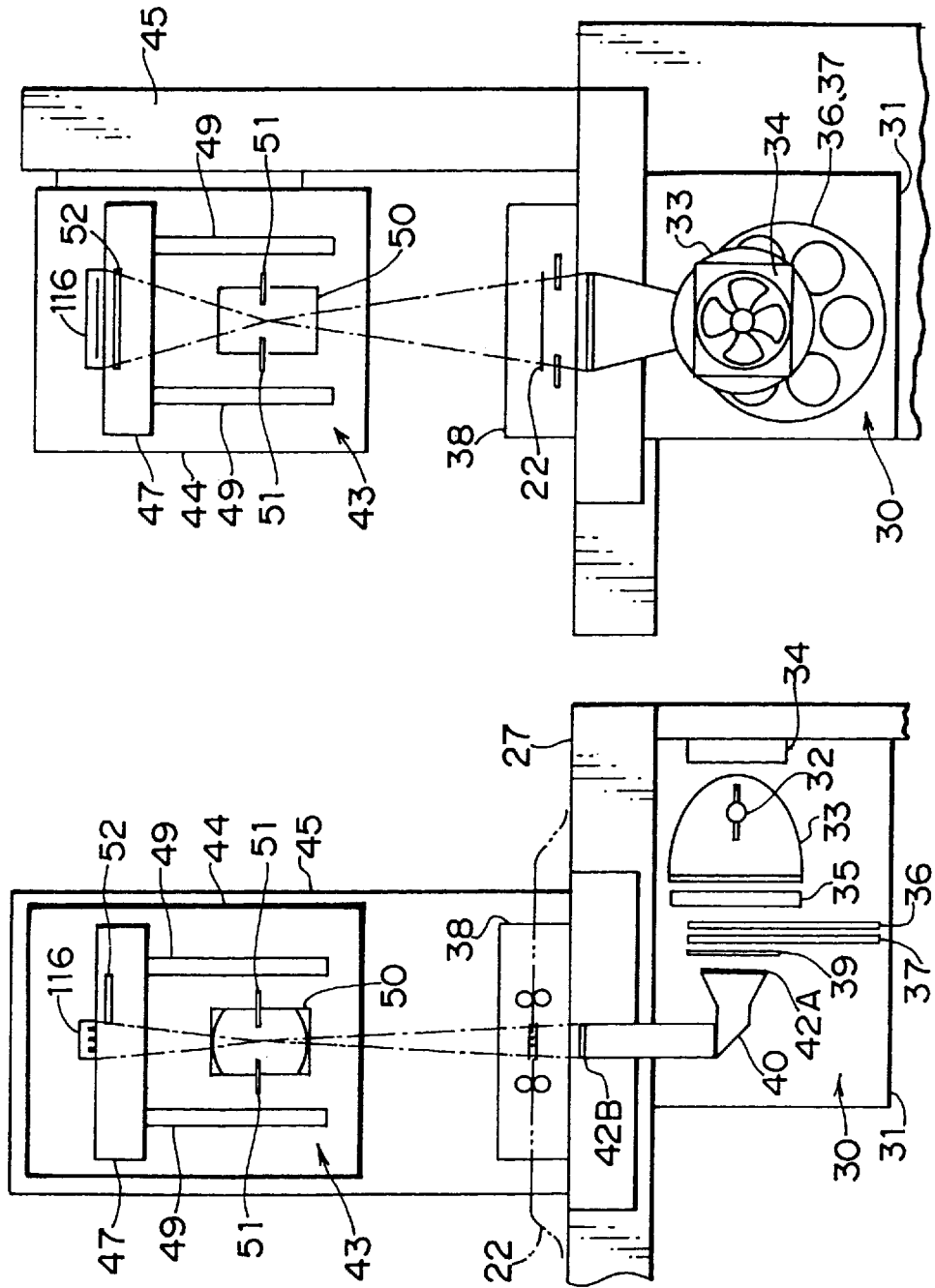

F I G. 4 A
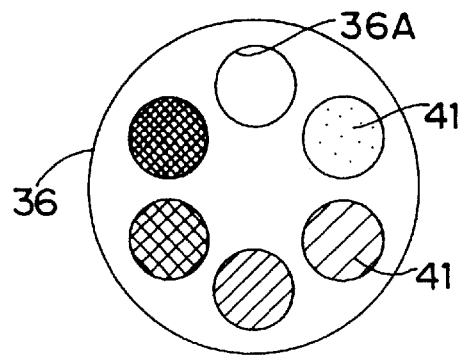
F I G. 4 B
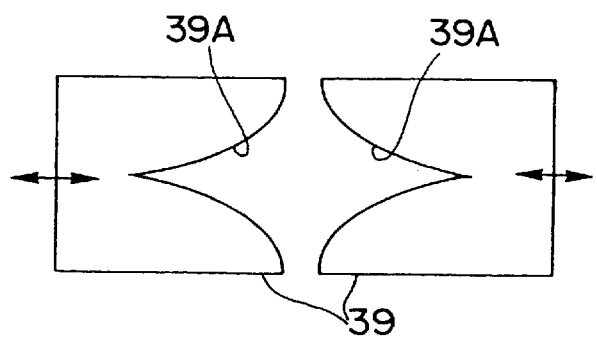
F I G. 4 C
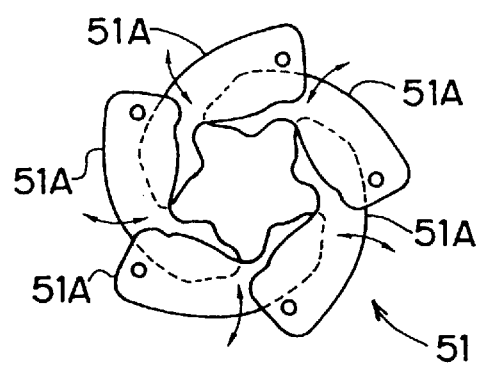
F I G. 4 D
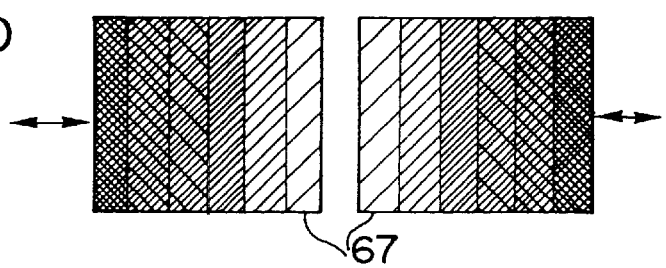
F I G. 4 E
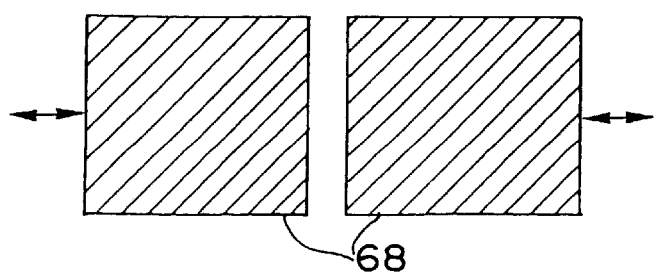

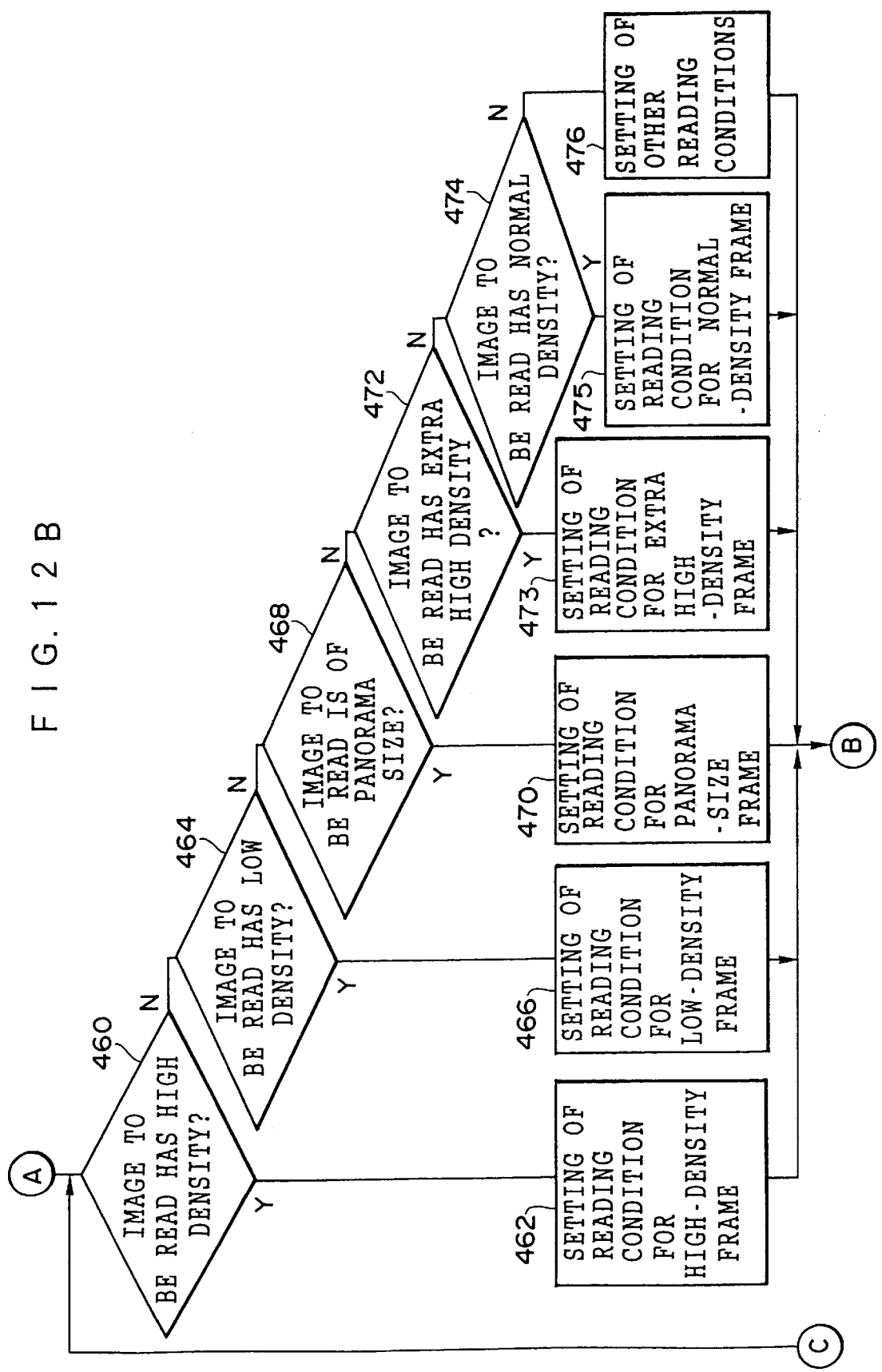

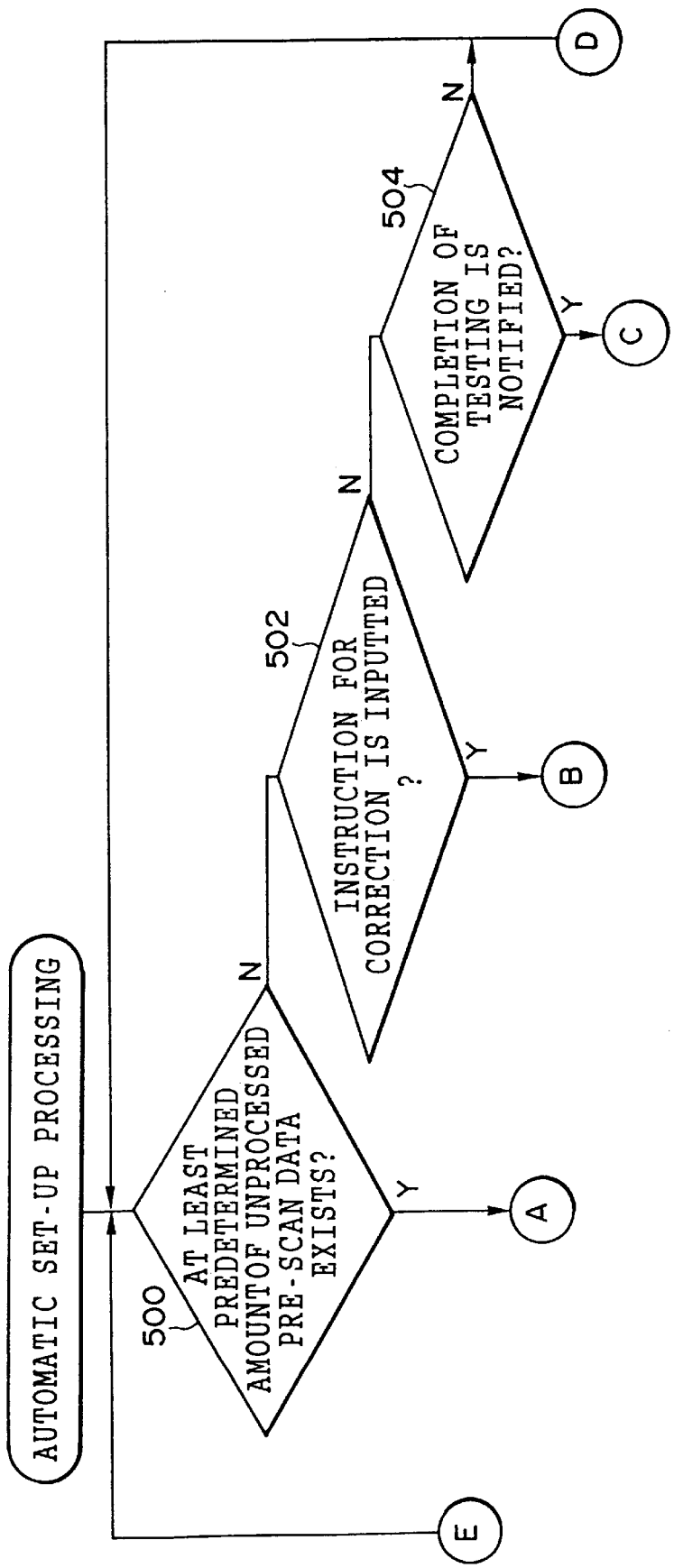

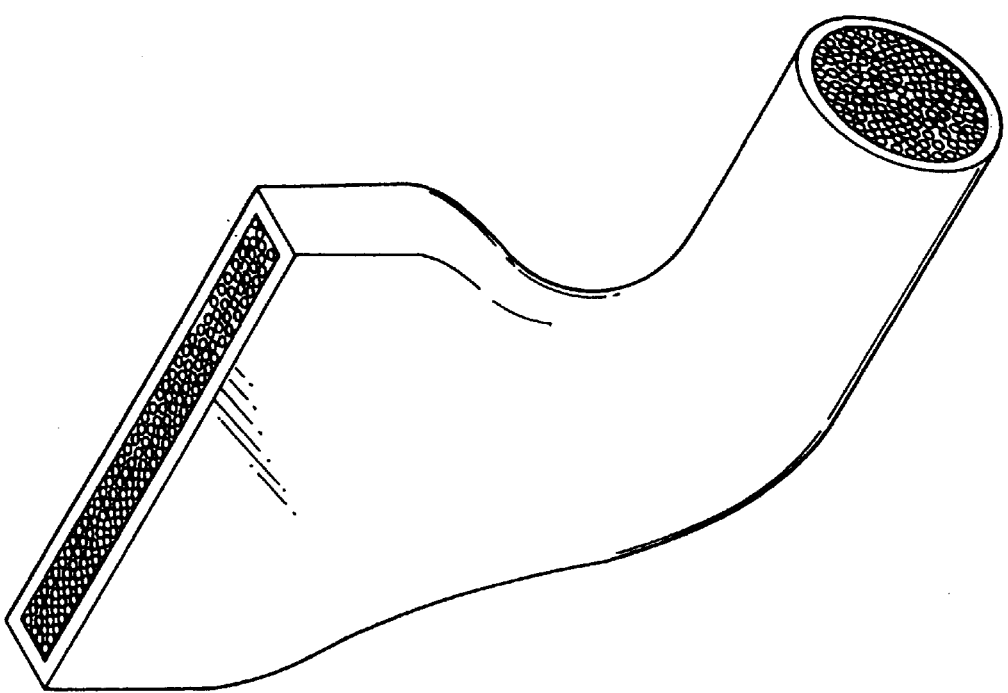
F I G. 1 6

IMAGE READING APPARATUS

BACKGROUND OF THE INVENTION

1. Field of the Invention

The present invention relates to an image reading apparatus, and particularly to an image reading apparatus which allows reading of an image recorded on a photographic film by separating the image into a plurality of component colors.

2. Description of the Related Art

There has recently been proposed a photographic processing method in which a film image recorded on a photographic film is read in such a manner as to be separated into component colors of R, G, and B, and image data obtained by reading the film image is subjected to image processing such as various corrections, and thereafter, an image is recorded on a recording material or is shown on a display. This photographic processing method has an advantage over conventional photographic processing methods in which a film image is recorded on a photographic printing paper by surface exposure in that the quality of a recorded image can be freely controlled by image processing for image data. However, the quality of the recorded image also depends on the quality of image data prior to image processing, i.e., the reading accuracy of a film image, and therefore, an image reading apparatus which allows reading of the film image with high accuracy and at high speed, namely, at a speed equal to or higher than the processing speed in the conventional photographic processing method becomes necessary.

There have conventionally been proposed various image reading apparatus structures which, as described above, read an image recorded on an original such as a photographic film so that the image is separated into a plurality of component colors, and outputs image data for the purpose of recording the image on the recording material, and the like. For example, there is known a process color scanner in which, with an original being wound onto an outer periphery of a cylindrical drum along the circumferential direction of the drum, the drum and the original are rotated integrally so as to allow relative movement of the original and a reading head disposed on the outer peripheral side of the drum, and white light emitted from a light source disposed within the drum and irradiated on and transmitted through the original is separated into a plurality of component colors and read by the reading head, and thereby obtaining image data of an image recorded on the original (see Japanese Patent Application Laid-Open (JP-A) No. 58-9145).

However, in the above-described color scanner, the circumferential length of the drum must be longer than the length of the recording material. When the color scanner is used for reading a film image recorded on an elongated photographic film, the diameter of the drum must be increased greatly due to the length of elongated photographic film such as 36 exposure size 135 film. Unfortunately, the apparatus must be made much larger. Further, during reading of the film image, a complicated operation is required in which a photographic film to be read is wound onto the drum and is set to be positioned at a fixed location on the outer peripheral surface of the drum. For this reason, operators have to carry out a great deal of labor and it is difficult to read a large amount of film images at high speed. Moreover, the above-described color scanner provides, as a precondition, reading of a positive image recorded on an original. For this reason, although there is no light controlling filter or the like for setting, at an arbitrary value, the ratio of the amount of light between component colors of light irradiated from the light source to the original, it is desirable that, in order to allow accurate reading of a negative image, a light controlling filter or the like be provided. With the above-described structure, however, provision of the light controlling filter or the like is difficult.

Further, in the industrial field of printing, the level of image quality required is very high. In order to acquire image data used for printing, the image must be read with extremely high accuracy. Accordingly, among image reading apparatuses for printing, there may be found a structure in which the flatness of an original is improved by setting the original in a cassette so that the entire surface of the original is held by a transparent flat plate. Then, a reading sensor and the original are moved relative to each other while the cassette in which the original is set is conveyed at a constant speed to allow reading of an image recorded on the original.

However, even when the above structure is applied to the reading of a film image, in the same manner as in the above-described color scanner, there is required a complicated operation in which a photographic film to be read is set in a cassette when reading the film image. For this reason, operators have to carry out a great deal of labor and it is difficult to read large amounts of film images at high speed. Further, when the cassette is formed so that an elongated photographic film is held over the entire surface thereof, the cassette becomes extremely large. Accordingly, it is not practical that the above-described technique be applied to effect reading of a film image recorded on the elongated photographic film.

Further, as an image reading apparatus for reading a film image, there is known a structure in which, with an area CCD sensor, which has a two-dimensional arrangement of a large number of photoelectric conversion elements and CCD cells, being used as a reading sensor, an elongated photographic film is intermittently conveyed so that film images recorded on the photographic film are each positioned sequentially at an image reading position set by the area CCD sensor, and these film images are sequentially read by the area CCD sensor (for example, FUJI FILM DEGITAL LAB SYSTEM, FRONTIER, (SCANNER & IMAGE PROCESSOR) SP-1000).

However, since the area CCD sensor is provided with a large number of photoelectric conversion elements and CCD cells, it is generally expensive. In order to read an image at a higher resolution, it is necessary to use an area CCD sensor having an extremely large number of cells proportional to the square of resolution, and therefore, there is a drawback in that the cost increases. Further, there is a possibility that area CCD sensors coming into the market as products may include a small number of cells from which a signal properly corresponding to the amount of incident light is not outputted due to the yield rate at the time of manufacturing (the so-called defective pixels), and therefore, a problem also exists in that a complex correction circuit becomes necessary so as to correct the defective pixels.

Moreover, there is also known an image reading apparatus of a simple structure which allows reading of a film image. In this device, a fluorescent lamp is used as the light source, and a light controlling filter for controlling the ratio in the amount of light between component colors of light irradiated on the photographic film, and a light diffusion box which diffuses light to be irradiated on the photographic film so as to alleviate nonuniformity of the amount of light are not provided. As a result, light from the light source is directly irradiated on the photographic film. This image reading apparatus is used to simply read a film image and does not allow highly accurate reading of a film image.

In addition, Japanese Patent Application Laid-Open (JP-A) Nos. 6-242521 and 6-242522 each disclose an image reading apparatus structured in such a manner that a pre-scan section in which a film image is preliminarily and roughly read by a line CCD and a fine-scan section in which a film image is read by the line CCD at a high resolution are disposed parallel to each other along a direction in which an elongated photographic film is conveyed, and a gradation conversion condition is prepared based on pre-scan image data obtained by reading the film image in the pre-scan section, and further, gradation conversion is effected for fine-scan image data obtained by reading the film image in the fine-scan section in accordance with the gradation conversion condition.

However, in the above-described structure, it is necessary that two sets of optical components including a line CCD, a light source, and an imaging lens be provided, and therefore, there arise problems in that the cost therefor increases and the structure becomes complicated. Further, in the above-described image reading apparatus, in consideration of a resolution for image reading required for the fine-scan section, a time required for a process effected based on the pre-scan image data, and the like, the resolution for image reading in the fine-scan section needs to be about ten times that for image reading in the pre-scan section. For this reason, it is necessary that the conveying speed of the photographic film in the pre-scan section and the conveying speed of the photographic film in the fine-scan section widely differ from each other and that a film buffer be provided between the pre-scan section and the fine-scan section so as to eliminate the difference in the conveying speed of the photographic film. The film buffer also causes complication of the structure.

Further, the position where the film image is recorded on the photographic film is not fixed. Accordingly, in the above-described structure, reading of the film image is effected in such a manner that a position where the film image is recorded is sequentially determined by an image plane detecting sensor while conveying the photographic film, and determination of the image recorded position and reading of the film image are effected concurrently. For this reason, it is necessary that the conveying speed of the photographic film be made relatively low. As a result, there also arises a problem in that the film image cannot be read at high speed.

SUMMARY OF THE INVENTION

In view of the above-described circumstances, it is an object of the present invention to provide an image reading apparatus which can realize reading of a film image recorded on a photographic film for each of component colors with accuracy and at high speed by using a simple and low-cost structure.

In order to achieve the above-described object, there is provided in accordance with a first aspect of the present invention an image reading apparatus comprising: a light source; light controlling means which can control an amount of light emitted from the light source for each light of component colors; light diffusion means which diffuses light emitted from the light source; conveying means which rotatively drives at least one pair of rollers or belts, by which an elongated photographic film with an image recorded is nipped, and thereby conveys the photographic film at a predetermined conveying speed along a conveying path which crosses the optical path of the light emitted from the light source; imaging means on which light transmitted through the photographic film is made incident so as to allow imaging of the image recorded on the photographic film; a line sensor on which light transmitted through the imaging means is made incident and which allows reading of the image by separating the image into component colors; and control means which controls at least the light controlling means, the conveying means, and the line sensor so that preliminary reading for the image recorded on the photographic film is effected under a predetermined reading condition, and thereafter, controls at least the light controlling means, the conveying means, and the line sensor so that main reading for the image is effected under a reading condition set up on the basis of the result of the preliminary reading.

The first aspect of the present invention provides the light controlling means which can control the amount of light emitted from the light source for each light of component colors, and the light diffusion means which diffuses the light emitted from the light source. When the ratio in the amount of light emitted from the light source between light of component colors is not proper, the ratio can be controlled by the light controlling means. Further, the amount of light emitted from the light source is made substantially uniform by the light diffusion means diffusing light to alleviate inconsistent amounts of light. Accordingly, it is possible to prevent deterioration of reading accuracy of an image read by the line sensor, which is caused by inconsistent amounts of light.

In accordance with a second aspect of the present invention, there is provided an image reading apparatus comprising: a light source section which can adjust the amount of light emitted therefrom for each light of the component colors; conveying means which rotatively drives at least one pair of rollers or belts, by which an elongated photographic film with an image recorded is nipped, and thereby conveys the photographic film at a predetermined conveying speed along a conveying path which crosses the optical path of the light emitted from the light source; imaging means on which light transmitted through the photographic film is made incident so as to allow imaging of the image recorded on the photographic film; a line sensor on which light transmitted through the imaging means is made incident and which allows reading of the photographic film by separating the photographic film into component colors; preliminary-reading control means which controls at least the light source section, the conveying means, and the line sensor so that preliminary reading which allows reading without separating into an image portion and a non-image portion on the photographic film is effected under a predetermined reading condition; determination means for determining a recorded position of each image on the photographic film based on a result of the preliminary reading; reading-condition setting means for setting a reading condition during main reading for each of images based on the result of the preliminary reading and a result of the determination of the recorded position of each image on the photographic film; and main-reading control means which controls, based on the result of the determination of the recorded position of each image on the photographic film, at least the light source section, the conveying means, and the line sensor so that main reading is effected which allows reading of each image recorded on the photographic film under the reading condition set by the reading-condition setting means.

According to the first and second aspects of the present invention, the conveying means rotatively drives a pair of rollers or belts, by which the elongated photographic film with the image recorded thereon is nipped, and thereby conveys the photographic film at a predetermined conveying speed along a conveying path which crosses the optical path of light emitted from the light source section. Accordingly, the photographic film can be conveyed irrespective of the length of the photographic film by being nipped by a pair of rollers or belts, and the image recorded on the photographic film can be sequentially located at the position which crosses the optical path of the light emitted from the light source section by driving to rotate a roller or a belt. As a result, when the image recorded on the photographic film is read, there is no need for a complicated operation such as setting of the photographic film in a drum or in a cassette. Even when film images recorded on a large amount of photographic films are each read, no labor is imposed upon the operator.

Further, according to the first and second aspects of the present invention, the line sensor is provided in which light transmitted through the imaging means which allows imaging of the image recorded on the photographic film is made incident and the image recorded on the photographic film is read in a state of being separated into component colors. In order that the image recorded on the photographic film (i.e., two-dimensional image) be read by the line sensor, although the photographic film needs to be conveyed at a constant speed while reading is effected, as compared with an area sensor, a remarkably small number of cells suffices for reading of the image at the same resolution and it is also easy to obtain a sensor having no defective pixels. Accordingly, cost reduction is achieved, and it becomes unnecessary to provide a correction circuit which corrects defective pixels or the structure of the correction circuit can be formed in a very simple manner.

Further, the preliminary-reading control means according to the second aspect of the present invention controls at least the light source section, the conveying means, and the line sensor so that preliminary reading is effected under predetermined reading conditions without differentiating between the image portion and the non-image potion on the photographic film. The preliminary reading thus allows reading without the image portion (i.e., the portion with an image recorded therein) and the non-image portion (i.e., the portion with no image recorded therein) on the photographic film being differentiated from each other, and therefore, as compared with the case in which only the image portion on the photographic film is read while the recorded position of each image on the photographic film is determined, reading of an image can be effected while the photographic film is conveyed at high speed. This reduces the time required for the preliminary reading.

The determination of the recorded position of each image on the photographic film is made by the determination means based on the result of the preliminary reading. The reading-condition setting means allows setting of the reading condition during the main reading for each image based on the result of the preliminary reading and the result of the determination of the recorded position of each image on the photographic film. The main-reading control means controls, based on the result of the determination of the recorded position of each image on the photographic film, at least the light source section, the conveying means, and the line sensor so that the main reading is effected which allows reading of each image recorded on the photographic film under the reading condition set by the reading-condition setting means.

In the first aspect and the second aspect of the present invention, a single line sensor is used to effect the preliminary reading and main reading of an image. Accordingly, it is possible to prevent increases in cost caused by providing respective sensors for the preliminary reading and the main reading. Further, even when the conveying speed of the photographic film during the preliminary reading differs widely from that during the main reading, there is no need to provide a film buffer to eliminate the difference in conveying speed, thereby making it possible to prevent complication of the structure of the device and to make the device smaller.

Further, the reading condition during the image reading includes the amount of light irradiated on the photographic film for each light of the component colors, the conveying speed of the photographic film, the length of one cycle of image reading by the line sensor, and the like. The amount of light irradiated on the photographic film for each light of the component colors can be varied by controlling the light source section. Further, the conveying speed of the photographic film can be varied by controlling the conveying means. The length of one cycle of image reading by the line sensor can be varied by controlling the line sensor.

Generally, the image reading sensor comprising the line sensor has properties in that when an integrated value of the amount of light made incident during one cycle of image reading exceeds an allowable value, saturation of output occurs, and when the integrated value of the amount of light is very small, output which represents image density accurately cannot be obtained. On the other hand, according to the first and second aspects of the present invention, the preliminary reading of an image to be read, which has an unknown image characteristic amount, is effected under predetermined reading conditions. When the main reading is effected in which the image characteristic amount of the image to be read becomes known from the result of the preliminary reading, in the first aspect of the present invention, reading is effected under the reading condition set by the result of the preliminary reading, and in the second aspect of the present invention, reading is effected under the reading condition set by the reading-condition setting means.

As a result, according to the first and second aspects of the present invention, for example, when it is determined that the entire density of the image to be read is low from the result of the preliminary reading, the entire amount of light irradiated on the photographic film for each light of the component colors is made low, the conveying speed of the photographic film is increased, the length of one cycle of image reading by the line sensor is reduced, or reading conditions having a combination of these is set. As a result, during the main reading of the image, high-level image reading can be achieved without causing saturation of output from the line sensor.

Further, for example, when it is determined that the entire density of the image to be read is high from the result of the preliminary reading, the entire amount of light irradiated on the photographic film for each light of the component colors is made higher, or the conveying speed of the photographic film is reduced, the length of one cycle of image reading by the line sensor is increased, or reading conditions having a combination of these is set. As a result, during the main reading of the image, high-level image reading can be achieved with just the right amount of incident light.

Further, for example, when it is determined that the density of a specified component color of the image to be read is high or low from the result of the preliminary reading, the reading condition is set so that the amount of light of the specified component color irradiated on the photographic film is made larger or smaller. As a result, in the main reading of the image, high-level image reading can be achieved for each of the component colors without the amount of light of the specified component color becoming too much or too little.

Accordingly, the first and second aspects of the present invention can each achieve reading of the film image recorded on the photographic film for each of the component colors with accuracy and at high speed with a simple and low-cost structure.

A third aspect of the present invention provides, in the second aspect, the image reading apparatus further comprising: display means which displays an image; cut-out means which cuts out data of each image from the result of the preliminary reading based on the result of the determination of the recorded position of each image on the photographic film; display control means which allows each image to be displayed on the display means by using data cut out by the cut-out means; and input means for inputting information which corrects a cut-out position of the image, wherein the determination means corrects, based on the inputted information, the result of the determination of the recorded position of each image on the photographic film when the information which corrects the cut-out position of the image is inputted by the input means.

According to the third aspect of the present invention, data of each image is cut out based on the result of the determination of the recorded position of each image on the photographic film and each image is displayed on the display means by using the cut-out data. Accordingly, it is possible for an operator to determine easily whether the result of the determination of the recorded position of each image by the determination means is appropriate by checking the image displayed on the display means. Further, when the information which corrects the cut-out position of the image is inputted, the determination means corrects the result of the determination of the recorded position of each image on the photographic film. For this reason, for example, when the operator decides on the basis of the result of the determination that the recorded position of a specified image is not appropriate, so long as the information which corrects the cut-out position of the image is inputted by the operator, the result of the determination by the determination means for the specified image is automatically corrected in accordance with the inputted information.

Accordingly, in the third aspect of the present invention, for example, even when a frame edge of an image recorded on the photographic film is not clearly seen (variation in density is small), it is possible to reliably determine the recorded position of the image and also reliably read, during the main reading of the image, the position at which an image is actually recorded on the photographic film.

A fourth aspect of the present invention provides, in the second aspect of the present invention, the image reading apparatus further comprising: processing-condition calculating means which calculates, for each of images, a processing condition of image processing for a result of the main reading of each image based on data cut out by the cut-out means; and image processing means which effects image processing for the result of the main reading of each image in accordance with the processing condition calculated by the processing-condition calculating means, wherein the display control means uses the data cut out by the cut-out means to allow an image, which corresponds to a result of image processing for each image under the processing condition calculated by the processing-condition calculating means, to be displayed on the display means, and the processing-condition calculating means corrects, when information which corrects the processing condition is inputted by the input means, the processing condition based on the inputted information.

In the fourth aspect of the present invention, based on the data cut out by the cut-out means, the processing condition of image processing for the result of the main reading of each image is calculated for each image by the processing-condition calculating means, and the image processing means effects image processing for the result of the main reading of each image in accordance with the calculated processing condition. The quality of an image recorded on the photographic film is greatly affected by photographing conditions during photographing and recording of the image, and therefore, images of inferior quality are often recorded on the photographic film. On the other hand, by calculating the processing condition of image processing for each image and effecting the image processing for the result of the main reading for each image in accordance with the processing condition, it becomes possible to obtain data which is equal to the case in which an image recorded at proper quality is read. However, a processing condition is not always necessarily calculated correctly by the processing-condition calculating means. Depending on the type of image, it is sometimes difficult to obtain a proper processing condition through calculations.

On the other hand, the display control means according to the fourth aspect of the present invention uses the data cut out by the cut-out means to allow an image, which corresponds to the result of image processing effected for each image under the processing condition calculated by the processing-condition calculating means, to be displayed on the display means. As a result, it is possible for an operator to easily determine whether the processing condition calculated by the processing-condition calculating means is proper by checking an image displayed on the display means. Further, when the information which corrects the processing condition is inputted by the input means, the processing-condition calculating means corrects the processing condition based on the inputted information. Accordingly, when it is determined by the operator that the processing condition of image processing calculated for the specified image is not proper, the processing condition of image processing for the specified image can be automatically corrected if the operator inputs the information which corrects the processing condition.

Accordingly, in the fourth aspect of the present invention, the proper processing condition can be reliably set even for an image for which the proper processing condition of image processing is difficult to obtain by calculation, and image processing can be effected constantly under the proper processing condition in accordance with the result gained from the main reading of the image.

Meanwhile, as the light controlling means of the present invention, there can be considered, for example, the structure in which a light controlling filter which decreases light of a specified component color is provided for each of the component colors and the amount by which a light controlling filter is inserted into an optical path of light emitted from the light source is controlled for each light controlling filter. However, in this structure, it is difficult to completely prevent color irregularity (i.e., ununiformity of the amount of light for each light of the component colors) even if the light controlled by the light controlling filter is diffused by the light diffusion means. The color irregularity of an image is apt to be conspicuous, and therefore, when the image is recorded on a recording material by using data obtained by the line sensor reading the image, the color irregularity is seen on the recorded image. For this reason, the light controlling means is preferably comprised of a turret on which a plurality of filters having different rates of decrease of light for light of the specified component color are mounted and in which any one of the plurality of filters is positioned on the optical path of light emitted from the light source, and the diaphragm which adjusts the amount of light emitted from the light source.

As a result, by rotating the turret to change the filter positioned on the optical path, the ratio between the amount of light of the specified component color and the amount of light of other component colors can be adjusted and the total amount of light can be adjusted by the diaphragm. In the above-described structure, any one of the filters mounted on the turret is positioned on the optical path and the ratio between the amount of light of the specified component color and the amount of light of the other component colors is adjusted by using the filter, and therefore, the color irregularity does not occur theoretically. Accordingly, the amount of light for each light of the component colors can be uniformly adjusted without causing spatial color irregularity.

Further, the line sensor which allows reading by separating an image into component colors can be realized by providing three line sensors and color separation prisms which are disposed between the photographic film and the line sensors and which each separate incident light into light of component colors and emit the same in different directions for each of the component colors. However, the color separation prisms are expensive, which results in an increase in the cost of the image reading apparatus. Further, there is also a drawback in that when the color separation prisms and the line sensors are mounted, high positional accuracy is required. For this reason, it is preferable that a three-line color CCD sensor be used as the line sensor. The three-line color CCD sensor is structured in such a manner that three line sensors are integrally arranged at intervals and color separation filters of different component colors are respectively provided at the light incidence sides of the line sensors. As a result, the color separation prisms become unnecessary and the line sensors can also be easily mounted, and therefore, the image reading apparatus can be structured at low cost.

BRIEF DESCRIPTION OF THE DRAWINGS

FIG. 1 is a schematic block diagram of a digital laboratory system according to an embodiment of the present invention.

FIG. 2 is an outside view of the digital laboratory system.

FIG. 3A is a front view which schematically shows an example of the structure of an optical system of a line CCD scanner.

FIG. 3B is a side view which schematically shows an example of the structure of the optical system of the line CCD scanner.

FIG. 4A is a plan view which shows an example of a turret.

FIG. 4B is a plan view which shows an example of a diaphragm.

FIG. 4C is a plan view which shows an example of a lens stop.

FIG. 4D is a plan view which shows another example of the diaphragm.

FIG. 4E is a plan view which shows still another example of the diaphragm.

FIGS. 12A, 12B, and 12C show a flow chart which indicates a film image reading operation executed by the microprocessor of the line CCD scanner.

FIGS. 13A, 13B, and 13C show a flow chart which indicates an automatic set-up operation executed by an automatic set-up engine of the image processing section.

FIG. 16 is a perspective view which shows an example of a light conducting device used in place of a light diffusion box.

DESCRIPTION OF THE PREFERRED EMBODIMENTS

Figure 5:
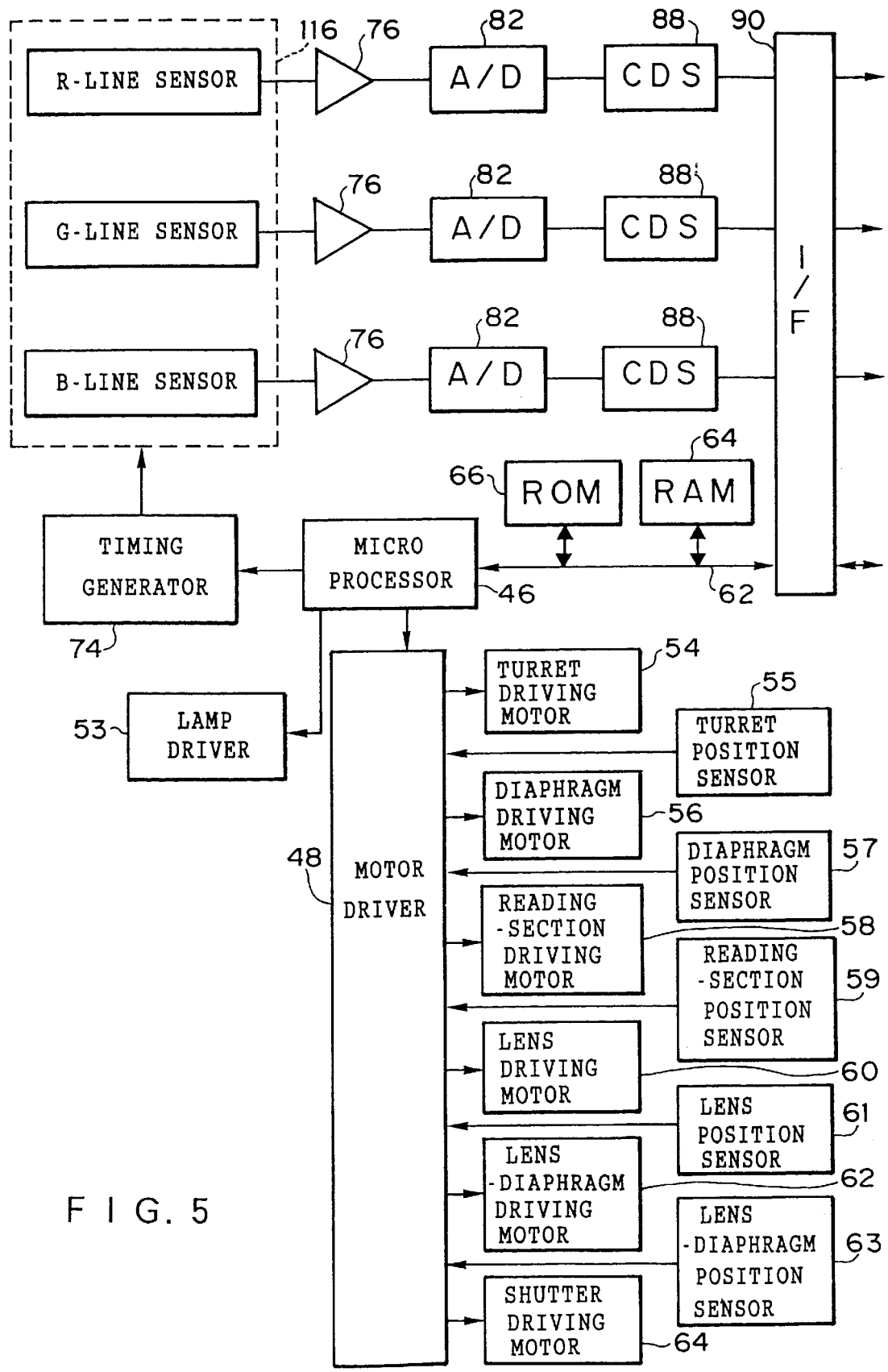
FIG. 5 is a block diagram which schematically shows the structure of an electric system of the line CCD scanner.

Referring now to the attached drawings, an embodiment of the present invention will be hereinafter described in detail.

First, a description will be given of a digital laboratory system according to the embodiment of the present invention.

Overview of an entire system:

FIG. 1 shows a schematic structure of a digital laboratory system 10 according to the embodiment of the present invention. FIG. 2 shows the exterior appearance of the digital laboratory system 10. As shown in FIG. 1, the laboratory system 10 is structured to include a line CCD scanner 14, an image processing section 16, a laser printer section 18, and a processor section 20. The line CCD scanner 14 and the image processing section 16 are integrated to form an input section 26 shown in FIG. 2 and the laser printer section 18 and the processor section 20 are integrated to form an output section 28 shown in FIG. 2.

The line CCD scanner 14 is used to read a film image recorded on a photographic film such as a negative film and a reversal film. Examples of the photographic film on which a film image to be read is recorded include a photographic film in 135 magazines, a photographic film in 110 magazines, and a photographic film with a transparent magnetic layer formed thereon (i.e., a photographic film in 240 magazines: the so-called APS film), and photographic films in 120 magazines and 220 magazines (Brownie size). The line CCD scanner 14 reads the film image to be read, as described above, by a line CCD and outputs image data.

The image processing section 16 is structured to allow input of image data outputted from the line CCD scanner 14 (i.e., scan image data) and also allow input of image data obtained by photographing using a digital camera, image data obtained by reading an original other than the film image (for example, a reflection original) with a scanner, image data generated by a computer, and the like (which will be generically referred to as file image data) from the outside (for example, input of image data via a storage medium such as a memory card or input of image data from the other information processing equipment via a communication line).

The image processing section 16 effects image processing including various corrections and the like for the input image data and outputs the image data, as recording image data, to the laser printer section 18. Further, the image processing section 16 also can output the image data subjected to the image processing, as an image file, to the outside (for example, the image data can be outputted to a storage medium such as a memory card or transferred to the other information processing equipment via a communication line).

The laser printer section 18 includes laser light sources of R, G, and B and causes laser light modulated to correspond to the recording image data inputted from the image processing section 16 to be irradiated onto a photographic printing paper to record an image on the photographic printing paper by scan exposure processing. Further, the processor section 20 effects various processes including color development, bleach-fixing, washing, and drying for the photographic printing paper on which an image is recorded by scan exposure processing in the laser printer section 18. As a result, an image is formed on the photographic printing paper.

Structure of line CCD scanner:

Next, a description will be given of the structure of the line CCD scanner 14 which is an image reading apparatus of the present invention. FIGS. 3A and 3B each show a schematic structure of an optical system of the line CCD scanner 14. The line CCD scanner 14 includes a light source section 30 disposed below an operation table 27 of the input section 26. The light source section 30 is accommodated within a metallic casing 31. A lamp 32 comprised of a halogen lamp, a metal halide lamp, or the like is disposed on the right side within the casing 31 (see FIG. 3A). The light source section 30 corresponds to a light source section of the present invention and the lamp 32 corresponds to a light source of the present invention.

A reflector 33 is disposed around the lamp 32 and a portion of light emitted from the lamp 32 is reflected by the reflector 33 in a fixed direction (i.e., toward the left side in FIG. 3A). A fan 34 is disposed on the side of the reflector 33 opposite to the side from which light is emitted. The fan 34 is actuated when the lamp 32 is turned on to prevent overheating of the interior of the casing 31. A UV/IR cut-off filter 35 (ultraviolet light/infrared light cut-off means), turrets 36, 37, a diaphragm 39, and a light diffusion box 40 are sequentially disposed on the light emission side of the reflector 33 along the optical axis of light emitted from the reflector 33. The UV/IR cut-off filter 35 cuts off light having wavelengths in the ultraviolet and infrared regions and so prevents an increase in the temperature of the photographic film 22. This improves reading accuracy.

As shown in FIG. 4A, a plurality of holes 36A are formed in the turret 36. Light controlling filters 41 which each decrease light of a specified component color among the colors of R, G, and B and which have different decreasing rates of light with respect to light of the specified component color (which will be hereinafter referred to as "first component color") are respectively fitted into all but one of the holes 36A. The turret 37 has virtually the same structure as that of the turret 36 except that a light controlling filter 41 which decreases light of a component color different from the above-described first component color (which will be hereinafter referred to as "second component color") is fitted into the holes of the turret 37. The turrets 36 and 37 are each disposed in such a manner that any one of the plurality of holes is located on the optical axis and these holes are shifted to be sequentially positioned on the optical axis due to rotation of each turret.

The diaphragm 39 is formed from a pair of plate materials with the optical axis interposed therebetween and is provided to move slidably so that the pair of plate materials move close to and away from each other. As shown in FIG. 4B, the pair of plate materials of the diaphragm 39 each has a notch 39A formed at one end of the plate material from the one end toward the other end in the sliding direction of the diaphragm 39 so that the cross-sectional area of the plate material along the direction perpendicular to the sliding direction continuously varies. These plate materials are disposed in such a manner that the sides thereof with the notches 39A formed therein face each other.

With the above-described structure, the ratio in the amount of light between the first component color and the other component colors varies depending on whether any one of the plurality of holes of the turret 36 is positioned on the optical axis, the ratio in the amount of light between the second component color and the other component colors varies depending on whether any one of the plurality of holes of the turret 37 is positioned on the optical axis. The amount of light transmitted through the diaphragm 39 varies depending on the position of the diaphragm 39. Accordingly, the amount of light of each component color exiting after having been transmitted through the turrets 36 and 37, and the diaphragm 39 can be uniformly adjusted by the turrets 36 and 37, and the diaphragm 39 without causing spatial color unevenness. The turrets 36 and 37, and the diaphragm 39 thus correspond to light controlling means of the present invention.

The light diffusion box 40 has a substantially L-shaped configuration with an intermediate portion thereof being bent perpendicularly. A total reflection mirror is disposed within the bent portion of the light diffusion box 40 and allows light made incident into the light diffusion box 40 to exit in the direction perpendicular to the direction in which light is made incident. A light exit opening of the light diffusion box 40 has a flat and rectangular configuration and the longitudinal direction thereof coincides with a direction perpendicular to the direction in which the photographic film 22 is conveyed by a film carrier 38 (which will be described later in detail) set on the operation table 27 (see FIGS. 3A and 3B). The dimension of the light diffusion box 40 along the transverse direction of the photographic film 22 gradually increases in a tapered manner from the bent portion to the light exit opening. Further, light diffusion plates 42A, 42B are respectively mounted at the sides where light is made incident on and exits from the light diffusion box 40.

Accordingly, light made incident on the light diffusion box 40 is deflected toward the film carrier 38 (i.e., the photographic film 22) at an angle of 90°, and is made into slit light of which longitudinal direction coincides with the transverse direction of the photographic film 22, and further is made into diffused light by the light diffusion plates 42A, 42B, and is finally emitted. Due to light emitted from the light diffusion box 40 being made into diffused light as described above, nonuniformity in the amount of light irradiated on the photographic film 22 is alleviated and a uniform amount of light is applied to a film image. Further, even when a flaw is present on a film image, the flaw is inconspicuous. The light diffusion box 40 and the light diffusion plates 42A and 42B thus correspond to light diffusion means of the present invention.

Meanwhile, in addition to having the above-described shape, the light diffusion box 40 may be formed such that the dimension thereof along the longitudinal direction of the photographic film 22 gradually decreases taperingly from the bent portion to the light exit opening.

A reading section 43 is disposed at the side of the operation table 27 opposite to the side at which the light source section 30 is disposed, and is accommodated within a casing 44. A supporting frame 45 is formed upright on the operation table 27 and the casing 44 is supported by the supporting frame 45 in such a manner as to move slidably in the directions in which the casing 44 moves close to and away from the operation table 27. A mount 47 is provided within the casing 44 and a plurality of supporting rails 49 hang down from the mount 47. A lens unit 50 is supported by the supporting rails 49 in such a manner as to move slidably in the directions in which the lens unit 50 moves close to and away from the operation table 27.

The lens unit 50 is comprised of a plurality of lenses and lens stops 51 are provided among these lenses. The lens unit 50 corresponds to imaging means of the present invention. As shown in FIG. 4C, the lens stop 51 includes a plurality of diaphragm plates 51A each having a substantially C-shaped configuration. These diaphragm plates 51A are disposed equally around the optical axis and one end portion of each of the diaphragm plates 51A is supported by a pin so that the diaphragm plates 51A can each be rotatable around the pin. The plurality of diaphragm plates 51A are connected together via a link (not shown), and when driving force of a lens-stop driving motor (which will be described later) is transmitted to the diaphragm plates 51A, the diaphragm plates 51A rotate in the same direction. Accompanied with the rotation of the diaphragm plates 51A, an area around the optical axis, in which light is not shaded by the diaphragm plates 51A (a substantially star-shaped area shown in FIG. 4C) varies and the amount of light transmitted through the lens stop 51 thereby varies.

A line CCD 116 is mounted on the upper surface of the mount 47. The line CCD 116 is structured in such a manner that a sensing portion, in which a large number of CCD cells and photoelectric conversion elements such as photodiodes are disposed in one row and an electronic shutter mechanism is disposed, is provided in each of three lines which are parallel to each other at intervals and color separation filters of R, G, and B are respectively mounted on the light-incidence sides of the sensing portions (i.e., the line CCD 116 is a so-called three-line color CCD). Further, a transfer portion comprised of a large number of CCD cells is provided in the vicinity of each of the sensing portions so as to correspond to the sensing portion. The charge accumulated in each of the CCD cells of each sensing portion is sequentially transferred via a corresponding transfer portion.

As described above, the line CCD 116 corresponds to a line sensor of the present invention. The three-line color CCD sensor need not have a color separation prism and can be mounted simply. Accordingly, reductions in cost of the line CCD scanner 14 can be achieved.

A dark-correcting CCD shutter 52 of the line CCD 116 is disposed on the light-incidence side of the line CCD 116. Meanwhile, the CCD shutter 52 includes an ND filter (not shown) mounted thereat and allows switching between a full-closed state in which light to be made incident on the line CCD 116 is shaded, a full-open state in which light is made incident on the line CCD 116, and a light decreased state in which light to be made incident on the line CCD 116 is decreased by the ND filter.

FIG. 5 shows a schematic structure of an electric system of the line CCD scanner 14. The line CCD scanner 14 includes a microprocessor 46 which effects control of the entire line CCD scanner 14. RAM 64 (for example, SRAM), ROM 66 (for example, ROM which can rewrite the stored content) are connected via a bus 62 to the microprocessor 46, and a lamp driver 53 and a motor driver 48 are also connected to the microprocessor 46. The lamp driver 53 allows the lamp 32 to be turned on and off in accordance with an instruction from the microprocessor 46.

Further, connected to the motor driver 48 are a turret driving motor 54, a turret position sensor 55, a diaphragm driving motor 56, a diaphragm position sensor 57, a reading-section driving motor 58, a reading-section position sensor 59, a lens driving motor 60, a lens position sensor 61, a lens-stop driving motor 62, a lens-stop position sensor 63, and a shutter driving motor 64. The turret driving motor 54 drives to rotate the turrets 36 and 37 independently so that any hole of the plurality of holes of each of the turrets 36 and 37 is positioned on the optical axis, and the turret position sensor 55 detects the position (i.e., the angle of rotation) of each of the turrets 36 and 37. The diaphragm driving motor 56 allows sliding movement of the diaphragm 39 and the diaphragm position sensor 57 detects the position of the diaphragm 39. The reading-section driving motor 58 allows sliding movement of the casing 44, having the reading section 43 accommodated therein, along the supporting frame 45 and the reading-section position sensor 59 detects the position of the casing 44 (i.e., the reading section 43). The lens driving motor 60 allows sliding movement of the lens unit 50 along the supporting rails 49 and the lens position sensor 61 detects the position of the lens unit 50. The lens-stop driving motor 62 allows rotation of the diaphragm plates 51A of the lens stop 51, the lens-stop position sensor 63 detects the position of the lens stop 51 (i.e., the positions of the diaphragm plates 51A), and the shutter driving motor 64 allows switching between the full-closed state, full-open state, and light decreased state of the CCD shutter 52.

The microprocessor 46 corresponds to pre-reading control means and main reading control means of the present invention. During pre-scan (preliminary reading) and fine-scan (main reading) of the line CCD 116, based on the respective positions of the turrets 36 and 37, and the diaphragm 39, which are detected by the turret position sensor 55 and the diaphragm position sensor 57, the turret driving motor 54 is used to drive the turrets 36 and 37 in a rotating manner and the diaphragm driving motor 56 is used to move the aperture 39 in a slidable manner, thereby allowing adjustment of the amount of light irradiated on a film image for each of the component colors.

Further, the microprocessor 46 determines zoom magnification in accordance with the size of a film image or depending on whether trimming is to be effected, and allows sliding movement of the casing 44 by the reading-section driving motor 58 based on the position of the casing 44 detected by the reading-section position sensor 59 so that the film image can be read by the line CCD 116 at the determined zoom magnification, and further, the lens unit 50 is moved slidably by the lens driving motor 60 based on the position of the lens unit 50 detected by the lens position sensor 61.

Meanwhile, when focusing control (automatic focusing control) is effected which allows the light receiving surface of the line CCD 116 to coincide with an imaging position of the film image set by the lens unit 50, the microprocessor 46 allows sliding movement of only the casing 44 by the reading-section driving motor 58. The focusing control can be effected so that, for example, the contrast of a film image read by the line CCD 116 becomes maximum (i.e., a so-called image contrast technique). Alternatively, the focusing control may also be effected based on a distance detected by a distance sensor in place of film-image data, the distance sensor being provided to measure the distance between the photographic film and the lens unit 50 (or the line CCD 116) by using infrared radiation or the like.

A timing generator 74 is connected to the line CCD 116. The timing generator 74 generates various timing signals (clock signals) for operating the line CCD 116, A/D converters 82, which will be described later, and the like. Signal output ends of the line CCD 116 are connected to the A/D converters 82 via amplifiers 76 and the signals outputted from the line CCD 116 are amplified by the amplifiers 76 and are converted to digital data in the A/D converters 82.

The output ends of the A/D converters 82 are each connected to an interface (I/F) circuit 90 via a correlated double sampling circuit (CDS) 88. The CDS 88 effects sampling of feed-through data which indicates the level of a feed-through signal and pixel data which indicates the level of a pixel signal and subtracts the feed-through data from the pixel data for each pixel. The calculated results (pixel data which respectively correspond correctly to the amounts of charge accumulated in the CCD cells) are sequentially outputted, as scan image data, to the image processing section 16 via the I/F circuit 90.

Meanwhile, photometric signals of R, G, and B are outputted concurrently from the line CCD 116, and therefore, three signal processing systems each including the amplifiers 76, the A/D converters 82, and CDSs 88 are provided and image data of R, G, and B are concurrently outputted, as scan image data, from the I/F circuit 90.

Figure 6:
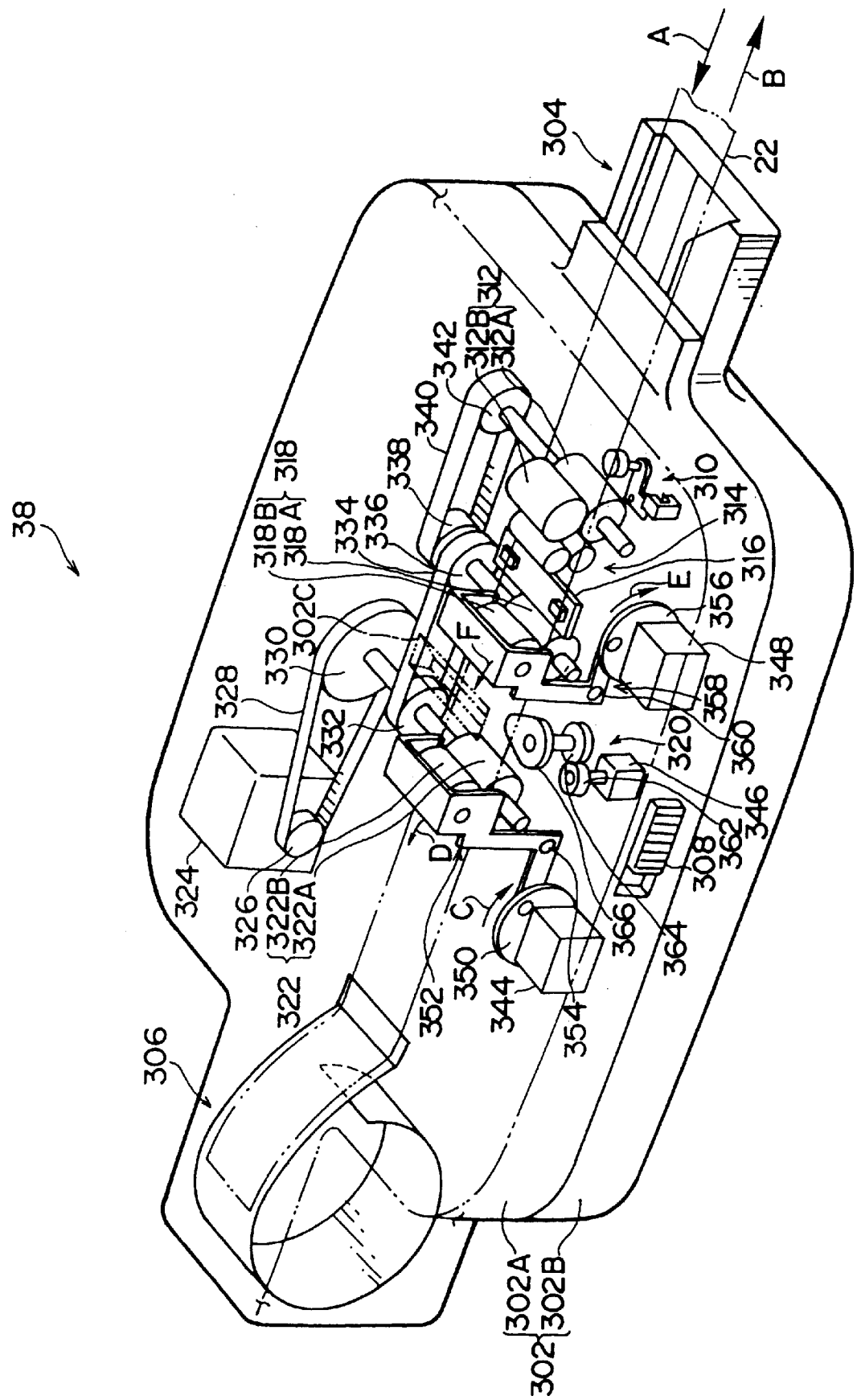
FIG. 6 is a partial perspective view which shows the structure of a film carrier for a photographic film in 135 magazines.

Structure of film carrier:

Next, a description will be given of the structure of the film carrier 38 (conveying means of the present invention) set on the operation table 27 with reference to FIG. 6. FIG. 6 shows, as an example, a film carrier for the photographic film 22 in 135 magazines.

The film carrier 38 includes a substantially box-shaped body 302 formed by an upper lid 302A and a base 302B and the body 302 accommodates various members used for conveying the film, which will be described later. An insertion opening 304 in which the photographic film 22 is inserted is provided at one end portion of the body 302 and an accommodating portion 306 in which the photographic film 22 is accommodated is provided at the other end portion of the body 302. Further, the body 302 is structured in such a manner that the upper lid 302A and the base 302B are released from an engaged state by operating an opening switch 308. In the state in which the upper lid 302A and the base 302B are released from the engaged state, the upper lid 302A can be rotated substantially upward around a hinge (not shown) provided on the side of the body 302 with respect to the opening switch 308.

A leading-end detecting sensor 310 which detects the leading end of the photographic film 22, a conveying roller pair 312, a dust-removing roller pair 314 which removes dust from the surface of the photographic film 22, a perforation sensor 316 which detects perforations, a conveying roller pair 318, a shade device 320 which shades slit light irradiated on the photographic film 22 in a region other than that corresponding to the size of a film image, and a conveying roller pair 322 are sequentially disposed within the body 302 along the film conveying path from the insertion opening 304 to the accommodating portion 306. In the conveying roller pairs 312, 318, and 322, rollers 312A, 318A, and 322A, which are disposed at the lower side in FIG. 6, serve as driving rollers and rollers 312B, 318B, and 322B, which are disposed at the upper side in FIG. 6, serve as driven rollers.

The conveying roller pairs 318 and 322 each correspond to rollers of the conveying means of the present invention and are disposed to face each other with the position on the photographic film 22, read by the line CCD 116, interposed therebetween.

Further, a pulse motor 324 which is a power source for driving the driving rollers 312A, 318A, and 322A is disposed within the body 302 and a pulley 326 is mounted at the driving shaft of the pulse motor 324. An endless belt 328 is wound around the pulley 326 and is also wound around a pulley 330 mounted at the rotating shaft of the driving roller 322A. Accordingly, the driving force of the pulse motor 324 is transmitted to the driving roller 322A via the pulley 326, the endless belt 328, and the pulley 330.

Further, a pulley 332 is mounted at the rotating shaft of the driving roller 322A and an endless belt 334 is wound around the pulley 332. The endless belt 334 is also wound around a pulley 336 mounted at the rotating shaft of the driving roller 318A. The driving force of the pulse motor 324 is also transmitted to the driving roller 318A via the pulley 332, the endless belt 334, and the pulley 336. Further, a pulley 338 is mounted at the rotating shaft of the driving roller 318A and an endless belt 340 is wound around the pulley 338. The endless belt 340 is also wound around a pulley 342 mounted at the rotating shaft of the driving roller 312A, and the driving force of the pulse motor 324 is also transmitted to the driving roller 312A via the pulley 338, the endless belt 340, and the pulley 342.

Provided within the body 302 are motors 344, 346, and 348. A circular plate 350 is eccentrically mounted at the driving shaft of the motor 344. One end of a connecting member 352 which allows vertical movement of the driven roller 322B is rotatably supported at a predetermined position near the outer edge of the circular plate 350. The connecting member 352 is supported so as to be rotatable around a supporting shaft 354. The driven roller 322B is rotatably supported at the side of the other end of the connecting member 352. For this reason, when the circular plate 350 rotates slightly by the driving force of the motor 344 in the direction indicated by arrow C in FIG. 6, the upper portion of the connecting member 352 (i.e., the portion of the connecting member 352 by which the driven roller 322B is supported) rotates slightly around the supporting shaft 354 in the direction indicated by arrow D and the driven roller 322B is separated from the driving roller 322A at a short distance.

In the same way as described above, a circular plate 356 is eccentrically mounted at the driving shaft of the motor 348 and one end of a connecting member 358 for allowing vertical movement of the driven roller 318B is fixed at a predetermined position near the outer edge of the circular plate 356. The connecting member 358 is supported so as to be rotatable around a supporting shaft 360 and the driven roller 318B is rotatably supported at the side of the other end of the connecting member 358. For this reason, when the circular plate 356 rotates slightly in the direction indicated by arrow E in FIG. 6 due to the driving force of the motor 348, the upper portion of the connecting member 358 (i.e., the portion of the connecting member 358 by which the driven roller 318B is supported) rotates slightly around a supporting shaft 360 in the direction indicated by arrow F and the driven roller 318B is separated from the driving roller 318A at a short distance.

A substantially central portion of the region between the conveying roller pairs 318 and 322 is provided as a reading position of the photographic film 22 and an elongated opening 302C is formed in the upper lid 302A directly above the reading position. Although not illustrated, an opening through which slit light emitted from the light source section 30 passes is formed in the base 302B directly below the reading position. As shown in FIG. 3, slit light is irradiated on the photographic film 22 conveyed by the film carrier 38 at the reading position from the lower side and the light transmitted through the photographic film 22 is made incident on the reading section 43 disposed above the film carrier 38.

Figure 7:
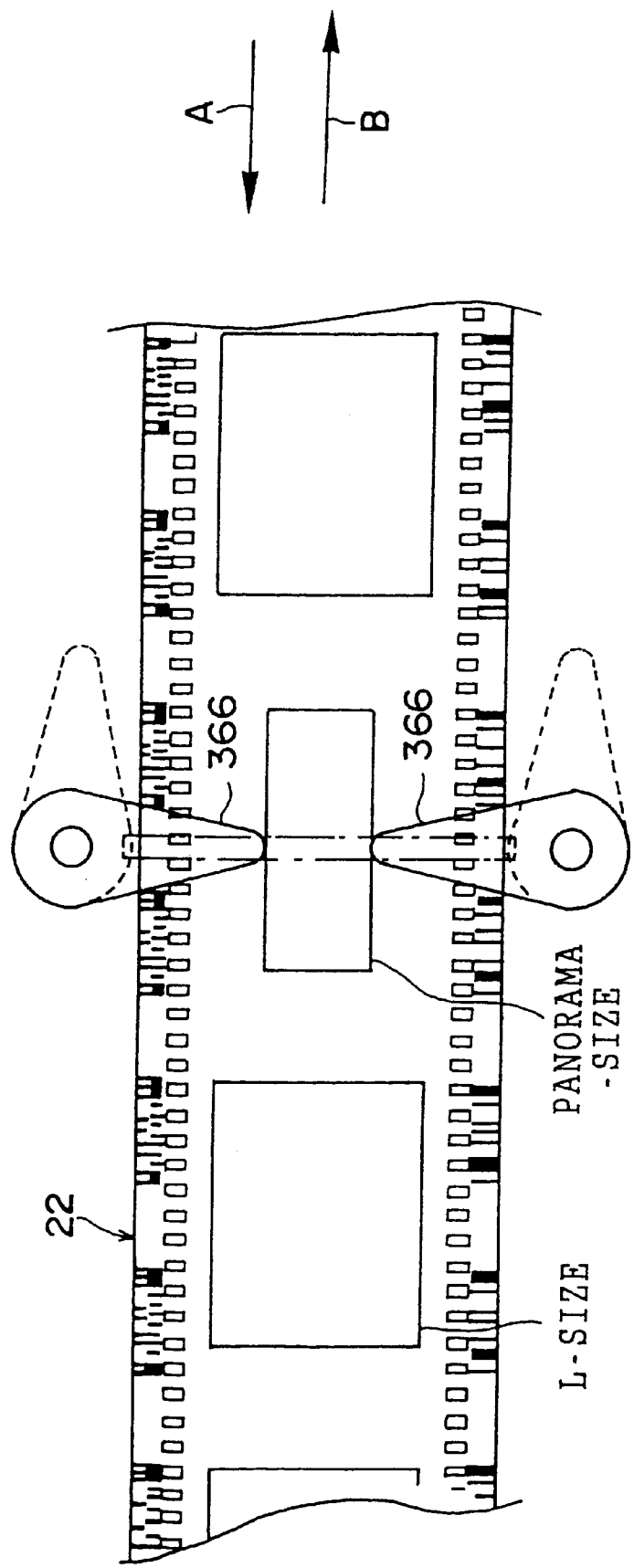
FIG. 7 is a plan view which shows positions of shade plates when a panorama-sized film image is read.

Further, as shown in FIG. 7, the above-described shade device 320 is used to shade slit light irradiated on the photographic film 22 passing the reading position in a region which corresponds to the size of a film image, and is provided in a pair with the conveying path of the photographic film 22 interposed therebetween (in FIG. 6, only the shade device at the front side on the paper thereof is shown). The shade device 320 is, as shown in FIG. 6, structured to include the motor 346, gears 362 and 364, and cam-shaped shade plate 366 mounted at the rotating shaft of the gear 364. For example, in the case of reading a panorama-sized film image, as shown in FIG. 7, the shade plates 366 are rotated to the positions indicated by the solid lines due to driving force of the motor 346. In the case of reading a standard-sized film image (so-called "L-size"), the shade plates 366 are rotated to the positions indicated by the dotted lines in FIG. 7. By blocking light in regions other than that to be read, saturation of accumulated charge in the line CCD 116 (see FIG. 3) can be prevented.

As described above, the film carrier 38 has the structure in which the photographic film is nipped and conveyed by the conveying roller pairs 312, 318, and 322. Therefore, by an operator inserting the leading end of the photographic film 22 in the insertion opening 304, the leading end of the photographic film 22 is detected by the leading-end detecting sensor 310, and the conveying roller pairs 312, 318, and 322 are driven to rotate at this timing so as to allow the photographic film 22 to be nipped and conveyed thereby. As a result, film images recorded on the photographic film 22 can be positioned sequentially at the reading position. Accordingly, even when film images recorded on large amounts of photographic films 22 are respectively read, no labor is imposed upon the operator.

Meanwhile, in the foregoing, there was described, as an example, the film carrier 38 for conveying the photographic film in 135 magazines. However, an exclusively-used film carrier is provided for each of a slide film held by a holder for a slide for each frame (i.e., a reversal film) and for an APS film (a film carrier exclusively used for the APS film has a magnetic head for reading information magnetically recorded on a magnetic layer). With each of these film carriers being set on the operation table 27, each of the above-described various photographic films is conveyed to the reading position and film images recorded thereon can be read by the line CCD 116.

Figure 8:
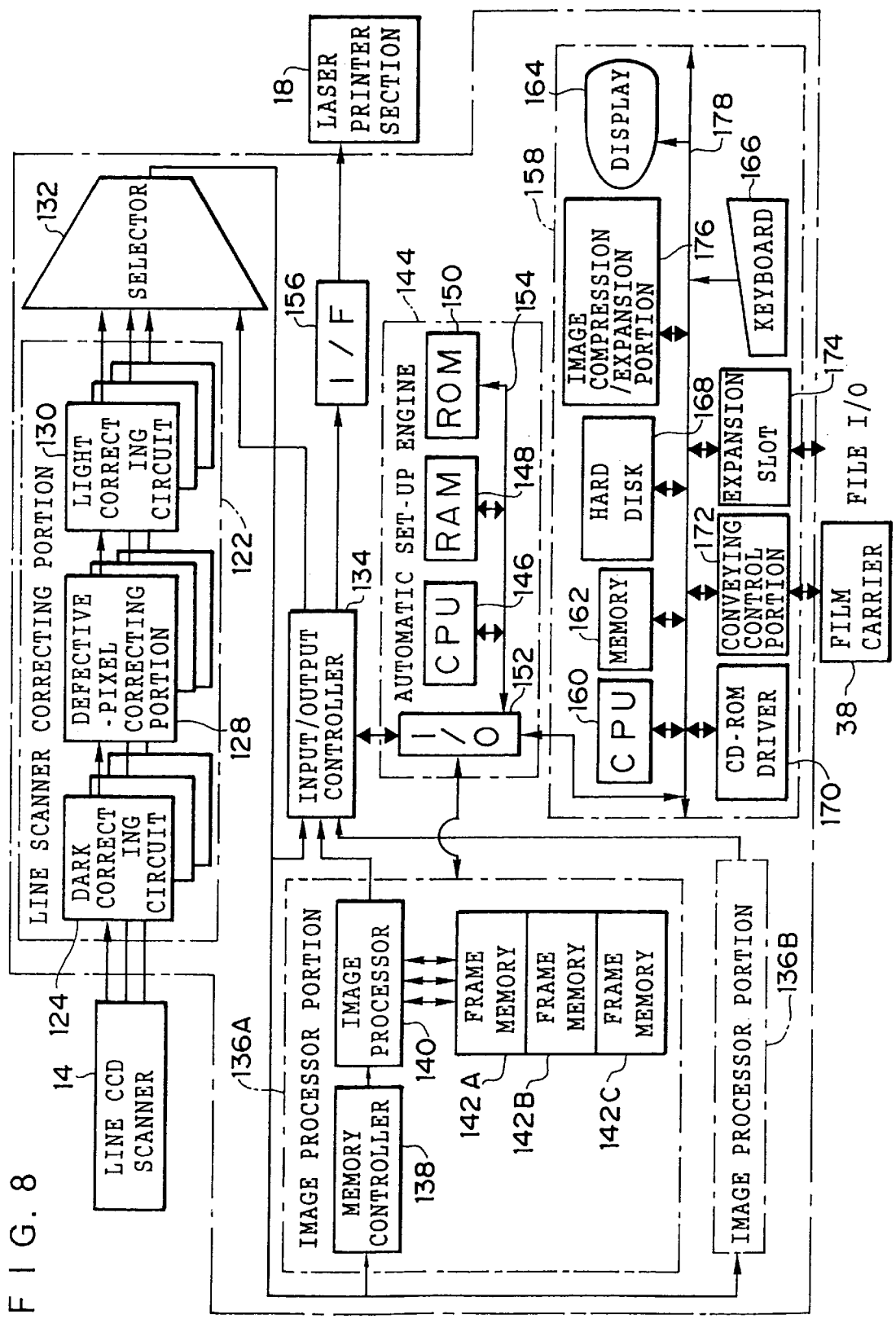
FIG. 8 is a block diagram which schematically shows the structure of an image processing section.

Structure of image processing section:

Next, a description will be given of the structure of the image processing section 16 with reference to FIG. 8. The image processing section 16 has a line scanner correcting portion 122 corresponding to the line CCD scanner 14. The line scanner correcting portion 122 includes three signal processing systems each having a dark correcting circuit 124, a defective-pixel correcting portion 128, and a light correcting circuit 130, correspondingly to image data of R, G, and B concurrently outputted from the line CCD scanner 14.

The dark correcting circuit 124 effects correction by storing, for each of cells, data inputted from the line CCD scanner 14 (i.e., data which represents a dark output level of each of cells of the sensing portion of the line CCD 116) in the state in which the light made incident on the line CCD 116 is cut off by the CCD shutter 52 and by subtracting the dark output level of a cell corresponding to each pixel from image data inputted from the line CCD scanner 14 after the photographic film 22 has been read by the line CCD 116.

Further, the photoelectric conversion characteristic of the line CCD 116 varies for each of the cells. In the light correcting circuit 130 after the defective-pixel correcting portion 128, with an adjusting film image whose entire image surface has a constant density being set on the line CCD scanner 14, a gain is set for each of the cells based on image data of the adjusting film image inputted from the line CCD scanner 14 after the adjusting film image has been read by the line CCD 116 (the variation in density between pixels represented by the image data results from variations of the photoelectric conversion characteristics of the cells), and image data of a film image to be read inputted from the line CCD scanner 14 is corrected for each pixel in accordance with the gain set for each of the cells.

On the other hand, when the density of a specified pixel in the image data of the adjusting film image is greatly different from that of other pixels, there is some abnormality about the cell of the line CCD 116 corresponding to the specified pixel and it can be determined that the specified pixel is defective. The defective-pixel correcting portion 128 stores an address of the defective pixel based on the image data of the adjusting film image. Among the image data of the film image to be read which is inputted from the line CCD scanner 14, data of the defective pixel is interpolated by data of peripheral pixels to allow generation of new data. Meanwhile, as compared with an area CCD, the line CCD has a small number of CCD cells, and therefore, the defective-pixel correcting portion 128 can be formed by a simple structure.

Further, the line CCD 116 is formed in three lines (rows of CCD cells) which are disposed along the conveying direction of the photographic film 22 at predetermined intervals, and therefore, there is the difference in time at which output of image data of each of component colors of R, G, and B from the line CCD scanner 14 starts between these component colors. The line scanner correcting portion 122 delays the image-data output timing based on different delay times of the component colors so that data of R, G, and B of the same pixel on the film image are outputted simultaneously.

Output ends of the line scanner correcting portion 122 are connected to input ends of a selector 132 and data outputted from the correcting portion 122 is inputted to the selector 132. The input end of the selector 132 is also connected to a data output end of an input/output controller 134 and external-input file image data is inputted from the input/output controller 134 to the selector 132. An output end of the selector 132 is connected to each data input end of the input/output controller 134 and image processor portions 136A and 136B. The selector 132 allows the inputted image data to be selectively outputted to each of the input/output controller 134 and the image processor portions 136A and 136B.

The image processor portion 136A includes a memory controller 138, an image processor 140, and three frame memories 142A, 142B, and 142C. The frame memories 142A, 142B, and 142C each have a capacity which allows storage of image data of a film image of one frame. The image data inputted from the selector 132 is stored in any one of the three frame memories and the memory controller 138 controls an address when the image data is stored in the frame memory 142 so that the inputted image data respectively corresponding to pixels are stored in a storage region of the frame memory 142 in such a state as to be arranged in a fixed order.

The image processor 140 fetches image data stored in the frame memory 142 and effects various image processing including gradation conversion, color conversion, hypertone processing which compresses gradation of extra-low frequency luminance components of an image, hyper-sharpness processing which highlights sharpness while suppressing granularity, and the like. Meanwhile, the processing condition of the above-described image processing is automatically calculated by an automatic set-up engine 144 (which will be described later) and the image processing is effected in accordance with the calculated processing condition. The image processor 140 is connected to the input/output controller 134, and after the image data subjected to the image processing is temporarily stored in the frame memory 142, the image data is outputted to the input/output controller 134 at a predetermined timing. The image processor portion 136B has the same structure as that of the above-described image processor portion 136A, and a description thereof will be omitted.

In the present embodiment, two reading operations of different resolutions are effected for each film image in the line CCD scanner 14. In the case of the first reading operation at a relatively low resolution (which will be referred to as "pre-scan"), even when the density of a film image is extremely low (for example, even when an overexposed negative image on a negative film is used), reading of the film image (the photographic film 22) is effected under a reading condition which is determined so as to prevent occurrence of saturation of accumulated charge in the line CCD 116 (the amount of light irradiated on the photographic film 22 for each wavelength of light of the colors R, G, and B, and the time of charge accumulated in the CCD). The data obtained by the pre-scan (i.e., pre-scan data) is inputted from the selector 132 to the input/output controller 134 and is also outputted to the automatic set-up engine 144 connected to the input/output controller 134.

The automatic set-up engine 144 includes CPU 146, RAM 148 (for example, DRAM), ROM 150 (for example, ROM which can rewrite the stored content), and an input/output port 152, which are connected together via a bus 154.

The automatic set-up engine 144 is used to determine a film image based on the pre-scan data inputted from the input/output controller 134 and extract data of a region corresponding to the film image (i.e., pre-scan image data). Subsequently, the type of the film image (size, density, and the like) is determined based on the pre-scan image data and a frame position and the type of the film image are outputted to the line CCD scanner 14, and at the same time, based on pre-scan image data of film images of a plurality of frames, a processing condition of the image processing for image data (fine-scan image data) obtained by the second reading operation by the line CCD scanner 14 at a relatively high resolution (which will be hereinafter referred to as "fine scan") is calculated and the calculated processing condition is outputted to the image processor 140 of the image processor portion 136.

In the calculation of the processing condition of the image processing, it is determined from an exposure amount during photographing, a type of a light source for photographing, and other characteristic amount, whether a plurality of film images with similar scenes photographed exists. When the plurality of film images with similar scenes photographed exists, the processing condition of image processing for fine-scan image data of these film images is determined so as to become identical or approximate.

Meanwhile, an optimum processing condition of image processing varies depending on whether image data after image processing is used for recording of an image on a photographic printing paper in the laser printer section 18 or is outputted externally. The image processing section 16 includes two image processor portions 136A, 136B, and therefore, for example, when image data is used for recording of an image on a photographic printing paper and is also outputted externally, the automatic set-up engine 144 calculates a processing condition most suitable for each of various purposes and outputs the calculated processing condition to the image processor portions 136A, 136B. As a result, in the image processor portions 136A, 136B, image processing is effected for the same fine-scan image data under different processing conditions.

Moreover, the automatic set-up engine 144 calculates, based on pre-scan image data of the film image inputted from the input/output controller 134, an image-recording parameter which defines gray balance and the like when an image is recorded on a photographic printing paper in the laser printer section 18, and outputs the calculated parameter simultaneously with outputting of recording image data (described later) to the laser printer section 18. Further, the automatic set-up engine 144 calculates a processing condition for image processing for file image data inputted from the outside in the same way as the aforementioned.

The input/output controller 134 is connected via an I/F circuit 156 to the laser printer section 18. When the image data after image processing is used for recording of an image on a photographic printing paper, the image data subjected to image processing in the image processor portion 136 is outputted, as recording image data, from the input/output controller 134 to the laser printer section 18 via the I/F circuit 156. Further, the automatic set-up engine 144 is connected to a personal computer 158. When the image data subjected to image processing is outputted externally as an image file, the image data subjected to image processing in the image processor portion 136 is outputted from the input/output controller 134 to the personal computer 158 via the automatic set-up engine 144.

The personal computer 158 includes a CPU 160, a memory 162, a CRT display (or liquid crystal display) 164 serving as display means of the third aspect of the present invention, a keyboard 166 (also seen in FIG. 2, a pointing device such as a mouse may be used), a hard disk 168, a CD-ROM driver 170, a conveying control portion 172, an expansion slot 174, and an image compression/expansion portion 176. These components are connected together via a bus 178. The conveying control portion 172 is connected to the film carrier 38 and controls conveying of the photographic film 22 effected by the film carrier 38. Further, when an APS film is set in the film carrier 38, information read by the film carrier 38 from the magnetic layer of the APS film (for example, a print size) is inputted.

A driver (not shown) which effects data reading/writing for a storage medium such as a memory card, or a communication control device which communicates with other information processing equipment is connected via the expansion slot 174 to the personal computer 158. When image data to be outputted externally is inputted from the input/output controller 134, the image data is outputted, as an image file, to the outside (for example, to the above-described driver or communication control device) via the expansion slot 174. Further, when file image data is inputted from the outside via the expansion slot 174, the inputted file image data is outputted to the input/output controller 134 via the automatic set-up engine 144. In this case, the input/output controller 134 outputs the inputted file image data to the selector 132.

Meanwhile, when the pre-scan image data or the like is outputted to the personal computer 158, a film image read by the line CCD scanner 14 is shown on the display 164 or an image obtained by being recorded on the photographic printing paper is estimated and shown on the display 164, and an instruction for correction of the image, or the like is given by an operator via the keyboard 166, the image processing section 16 also allows the correction of an image to be reflected in the processing condition for image processing.

Figure 9:
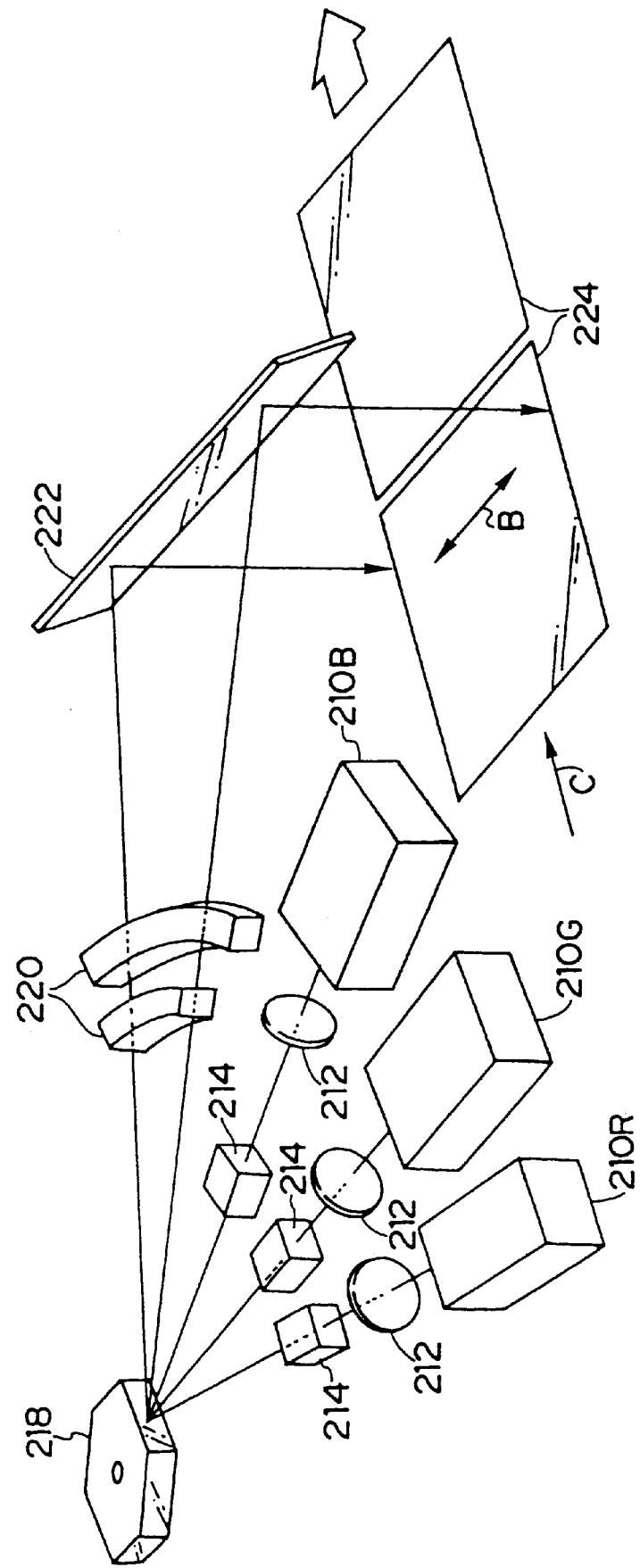
FIG. 9 is a schematic structural diagram of an optical system of a laser printer section.

Structures of laser printer section and processor section:

Next, a description will be given of the laser printer section 18 and the processor section 20. FIG. 9 shows the structure of an optical system of the laser printer section 18. The laser printer section 18 includes three laser light sources 210R, 210G, and 210B. The laser light source 210R is formed from a semiconductor laser (LD) which emits laser light having a wavelength of R. The laser light source 210G is formed from an LD and a wavelength conversion element (SHG) which converts laser light emitted from the LD to laser light whose wavelength is a half thereof and an oscillation wavelength of the LD is determined so that laser light having a wavelength of G is emitted from the SHG. Similarly, the laser light source 210B is also formed from the LD and SHG and the oscillation wavelength of the LD is determined so that laser light having a wavelength of B is emitted from the SHG.

A collimator lens 212 and an acoustooptic light modulation element (AOM) 214 are sequentially disposed at a laser light exit side of each of the laser light sources 210R, 210G, and 210B. Each AOM 214 is disposed so as to allow incident laser light to be transmitted through an acoustooptic medium and is also connected to an AOM driver 216 (see FIG. 10). When a high-frequency signal is inputted from the AOM driver 216, an ultrasonic wave corresponding to the high-frequency signal is propagated through the acoustooptic medium and an acoustooptic effect acts on laser light transmitted through the acoustooptic medium to cause diffraction. As a result, laser light having an intensity corresponding to the amplitude of the high-frequency signal is emitted, as diffracted light, from each AOM 214.

A polygon mirror 218 is disposed at the side where diffracted light is emitted from each AOM 214. Three laser light beams each having wavelengths of R, G, and B, which are emitted as diffracted light from the AOMs 214, are irradiated on the reflecting surface of the polygon mirror 218 substantially at the same position and are further reflected by the polygon mirror 218. An fθ lens 220 and a plane mirror 222 are disposed at the side where laser light is emitted from the polygon mirror 218 and the three laser light beams reflected by the polygon mirror 218 are transmitted through the fθ lens 220, reflected by the plane mirror 222, and then irradiated on the photographic printing paper 224.

Figure 10:
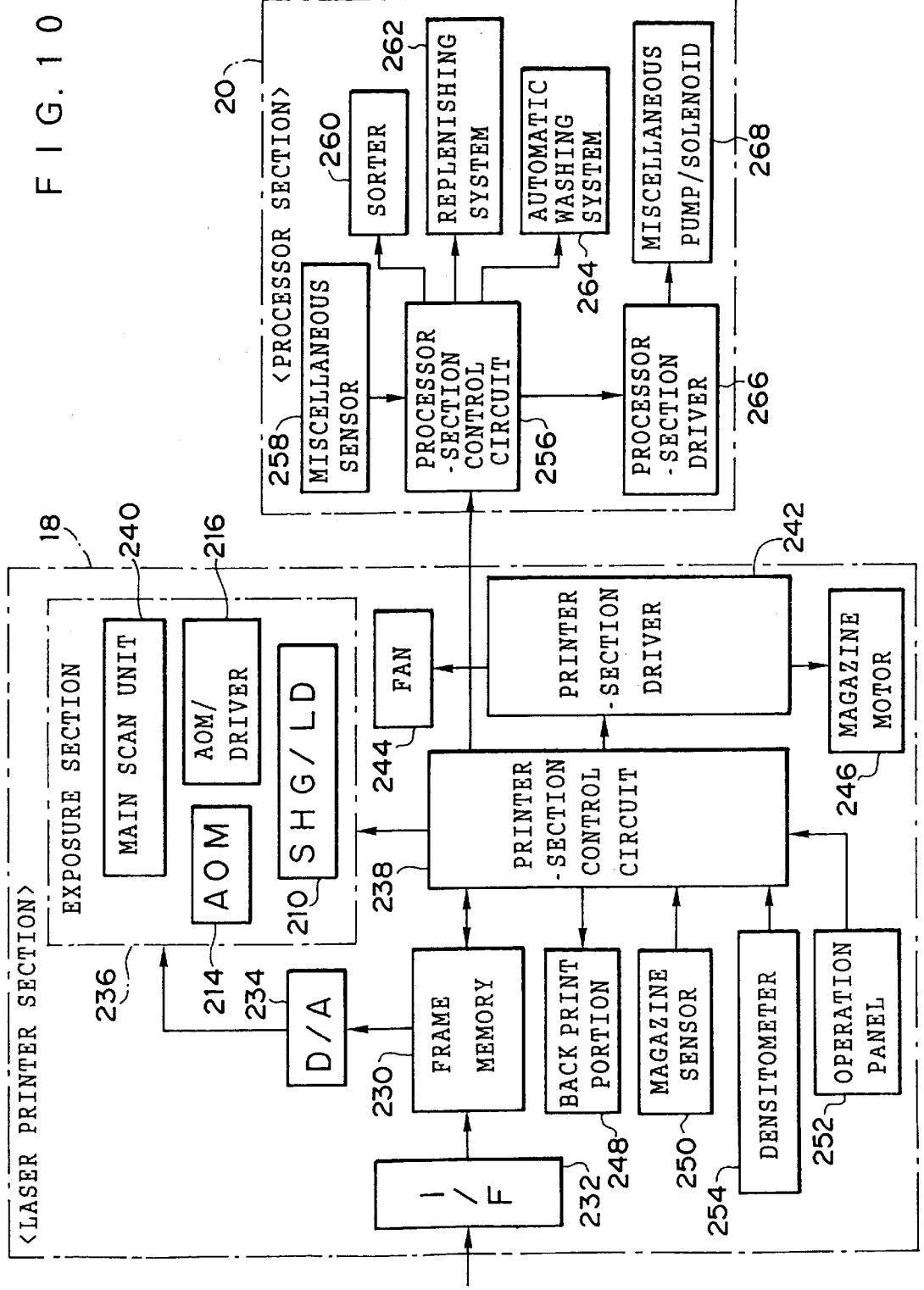
FIG. 10 is a block diagram which schematically shows the structure of each electric system of the laser printer section and a processor section.

FIG. 10 schematically shows the structures of electric systems of the laser printer section 18 and the processor section 20. The laser printer section 18 includes a frame memory 230 which stores image data. The frame memory 230 is connected via an I/F circuit 232 to the image processing section 16 and recording image data inputted from the image processing section 16 (i.e., image data which represent densities of R, G, and B for each of the pixels of an image to be recorded on the photographic printing paper 224) are temporarily stored in the frame memory 230 via the I/F circuit 232. The frame memory 230 is connected via a D/A converter 234 to an exposure section 236 and is also connected to a printer-section control circuit 238.

The exposure section 236 includes, as described above, three laser light sources 210 each formed from the LD (and the SHG) and three systems each including AOM 214 and AOM driver 216, and also includes the polygon mirror 218 and a main-scan unit 240 having a motor for rotating the polygon mirror 218. The exposure section 236 is connected to the printer-section control circuit 238 and the operation of each portion thereof is controlled by the printer-section control circuit 238.

In order that an image represented by image data for recording is recorded on the photographic printing paper 224 by scan and exposure, the printer-section control circuit 238 effects, based on an image-recording parameter inputted from the image processing section 16, various corrections for the recording image data to prepare image data for scan and exposure and stores the prepared image data in the frame memory 230. Subsequently, the polygon mirror 218 of the exposure section 236 is rotated and laser light is emitted from each of the laser light sources 210R, 210G, and 210B, and further, the prepared image data for scan and exposure is outputted from the frame memory 230 to the exposure section 236 via the D/A converter 234. As a result, the image data for scan and exposure is converted to an analog signal and is further inputted to the exposure section 236.

The AOM driver 216 varies the amplitude of an ultrasonic signal supplied for the AOM 214 in accordance with the level of the inputted analog signal and modulates the intensity of laser light emitted as diffracted light from the AOM 214 in accordance with the level of the analog signal (i.e., any one of densities of R, G, and B of each pixel of an image to be recorded on the photographic printing paper 224). Accordingly, laser light beams of R, G, and B, of which intensity is modulated in accordance with the densities of R, G, and B of the image to be recorded on the photographic printing paper 224 are emitted from the three AOMs 214 and these laser light beams are irradiated together on the photographic printing paper 224 via the polygon mirror 218, the fθ lens 220, and the mirror 222.

The main scan is effected in such a manner that the position where each laser light beam is irradiated is scanned along the direction indicated by arrow B in FIG. 9 accompanied with the rotation of the polygon mirror 218 and sub-scan of laser light is effected in such a manner that the photographic printing paper 224 is conveyed at constant speed along the direction indicated by arrow C in FIG. 9, and therefore, an image is recorded on the photographic printing paper 224 by scan and exposure. The photographic printing paper 224 on which the image has been recorded by scan and exposure is transferred to the processor section 20.

A printer-section driver 242 is connected to the printer-section control circuit 238. Connected to the printer-section driver 242 are a fan 244 and a magazine motor 246. The fan 244 blows air against the exposure section 236 and the magazine motor 246 is used to pull out the photographic printing paper accommodated in a magazine mounted in the laser printer section. Further, connected to the printer-section control circuit 238 is a back print portion 248 in which characters and the like are printed onto the rear surface of the photographic printing paper 224. Each operation of the fan 244, the magazine motor 246, and the back print portion 248 is controlled by the printer-section control circuit 238.

Further, also connected to the printer-section control circuit 238 are a magazine sensor 250, an operation panel 252 (also seen in FIG. 2), a densitometer 254, and a processor-section control circuit 256 of the process section 20. The magazine sensor 250 detects a mounted/detached state of the magazine in which an unexposed photographic printing paper 224 is accommodated and the size of the photographic printing paper accommodated in the magazine, the operation panel 252 is used by an operator to input various instructions, the densitometer 254 measures the density of an image visualized after the image has been subjected to development and the like in the processor section 20.

Connected to the processor-section control circuit 256 is a sensor 258 of various kinds which detect passing of the photographic printing paper 224 conveyed on the conveying path within the machine body of the processor section 20 and the liquid-surface position of each of various processing solutions filled in a processing tank, and the like.

Further, connected to the processor-section control circuit 256 are a sorter 260 (also seen in FIG. 2), a replenishing system 262, and an automatic washing system 264. The sorter 260 is used to sort, every predetermined group, photographic printing papers subjected to development processing and the like and discharged from the machine body, the replenishing system 262 is used to replenish the processing tank of the replenishing solution, and the automatic washing system 264 allows washing of rollers and the like. Further, a pump/solenoid 268 of various kinds are connected via a processor-section driver 266 to the processor-section control circuit 256. Each operation of the sorter 260, the replenishing system 262, the automatic washing system 264, and the pump/solenoid 268 of various kinds are controlled by the processor-section control circuit 256.

Operation:

Next, as the operation of the present embodiment, there will be described a line-scanner control operation executed by the microprocessor 46 of the line CCD scanner 14 with reference to the flow chart shown in FIGS. 11A to 11C.

The line CCD scanner 14 sets in advance, for example as shown in Table 1 listed below, a plurality of modes: "initial state mode"; "pre-scan mode"; "fine-scan mode"; "power-save mode"; "light correction mode"; "dark correction mode"; and "linearity correction mode", and also sets in advance respective states of the parts of the line CCD scanner 14 in each of the above modes (for "fine-scan mode", the states of the parts are further set for each of density types of a film image subjected to fine-scan, for example, high density/low density/panorama size/extra-high density/standard density).

TABLE 1

| Mode | Light Source | Light Source Stop | Color-adjusted Light | Magnification |
|---|---|---|---|---|
| initial state | on | full-open | — | unfixed |
| pre-scan fine scan | on | $P_0$ | full-open | 1.0 |
| high-density frame | on | $P_1$ | $P_1$ | 1.0 |
| low-density frame | on | $P_2$ | $P_2$ | 1.0 |
| panorama frame | on | $P_3$ | $P_3$ | 1.3 |
| extra high-density frame | on | $P_4$ | $P_4$ | 1.0 |
| standard density frame | on | $P_7$ | $P_7$ | 1.0 |
| termination state | on | full-closed | — | 1.0 |
| power-saving | off | full-closed | — | — |
| light correction | on | $P_5$ | full-open | 1.0 |
| dark correction | off | — | full-open | 1.0 |
| linearity correction | on | $P_6$ | full-open | 1.0 |

| Mode | Lens Stop | CCD Shutter | CCD Electronic Shutter | Sub-scan Speed |
|---|---|---|---|---|
| initial state | full-open | full-open | — | — |
| pre-scan fine scan | full-open | full-open | minimum (t) | highest (5 × v) |
| high-density frame | full-open | full-open | minimum (t) | normal (v) |
| low-density frame | full-open | full-open | minimum (t) | normal (v) |
| panorama frame | $P_L$ | full-open | minimum (t) | v/1.3 |
| extra high-density frame | full-open | full-open | 4 × t | v/4 |
| standard density frame | full-open | full-open | minimum (t) | normal (v) |
| termination state | full-open | full-open | minimum (t) | normal (v) |
| power-saving | — | — | — | — |
| light correction | full-open | full-open | from minimum to maximum | — |
| dark correction | — | full-closed | | — |
| linearity correction | full-open | ND1.0 | — | — |

Although in Table 1, only the panorama size is shown as a nonstandard size, the respective states of the parts when fine scan is effected for a film image of other size such as high-vision size may also be set separately.

Figure 11A:
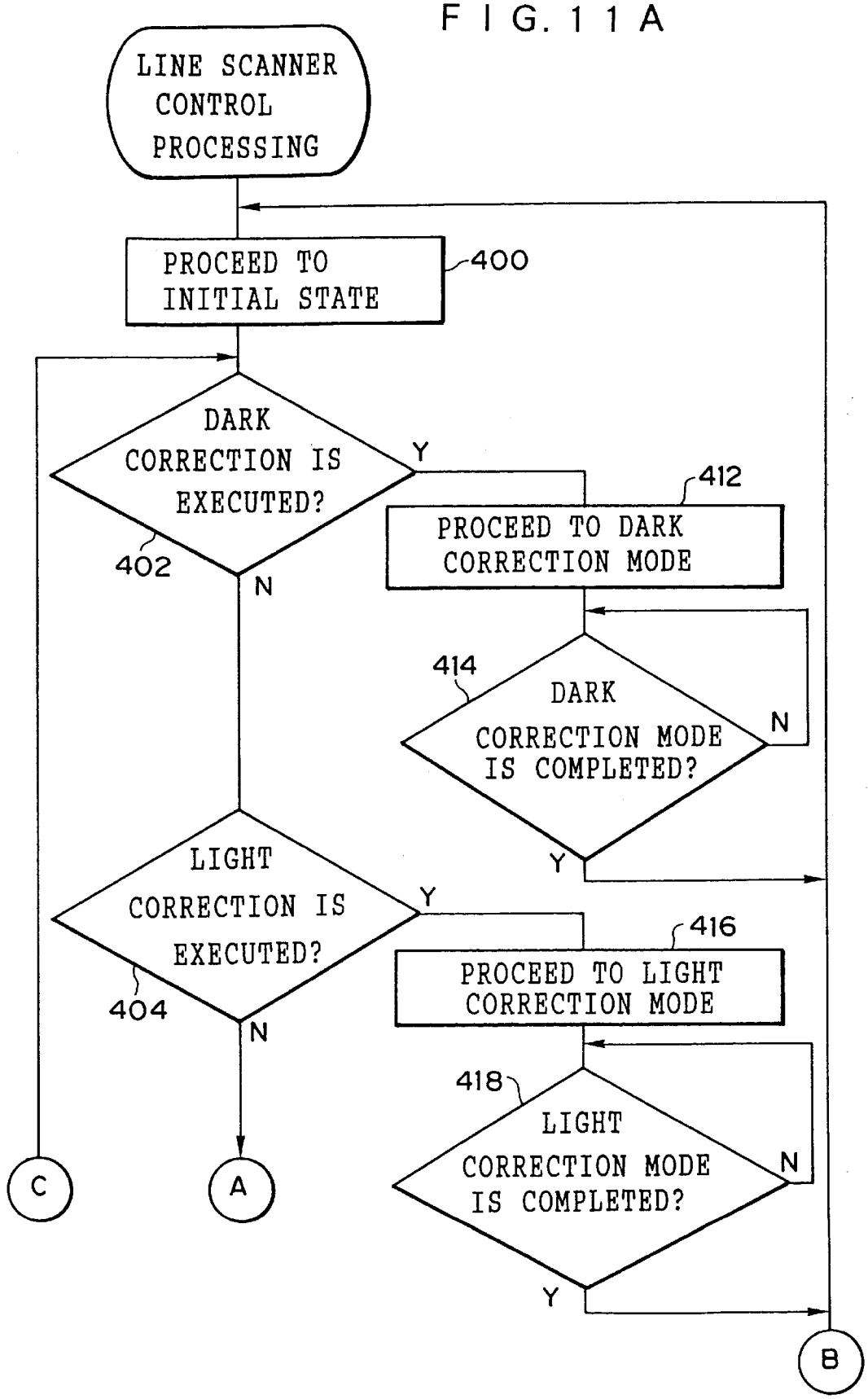
FIGS. 11A, 11B, and 11C show a flow chart which indicates a line scanner control operation executed by a microprocessor of the line CCD scanner.
Figure 11B:
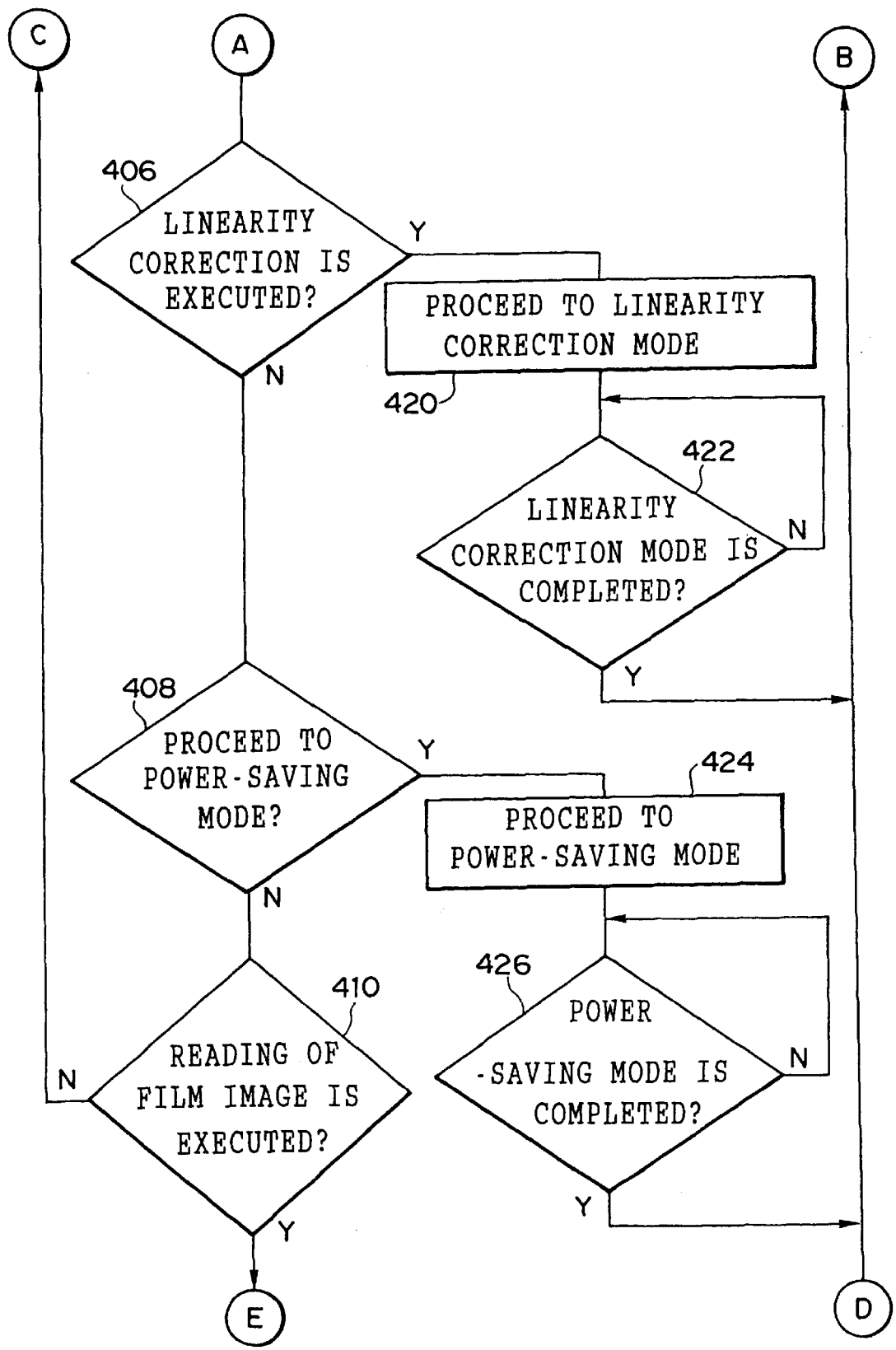
Figure 11C:
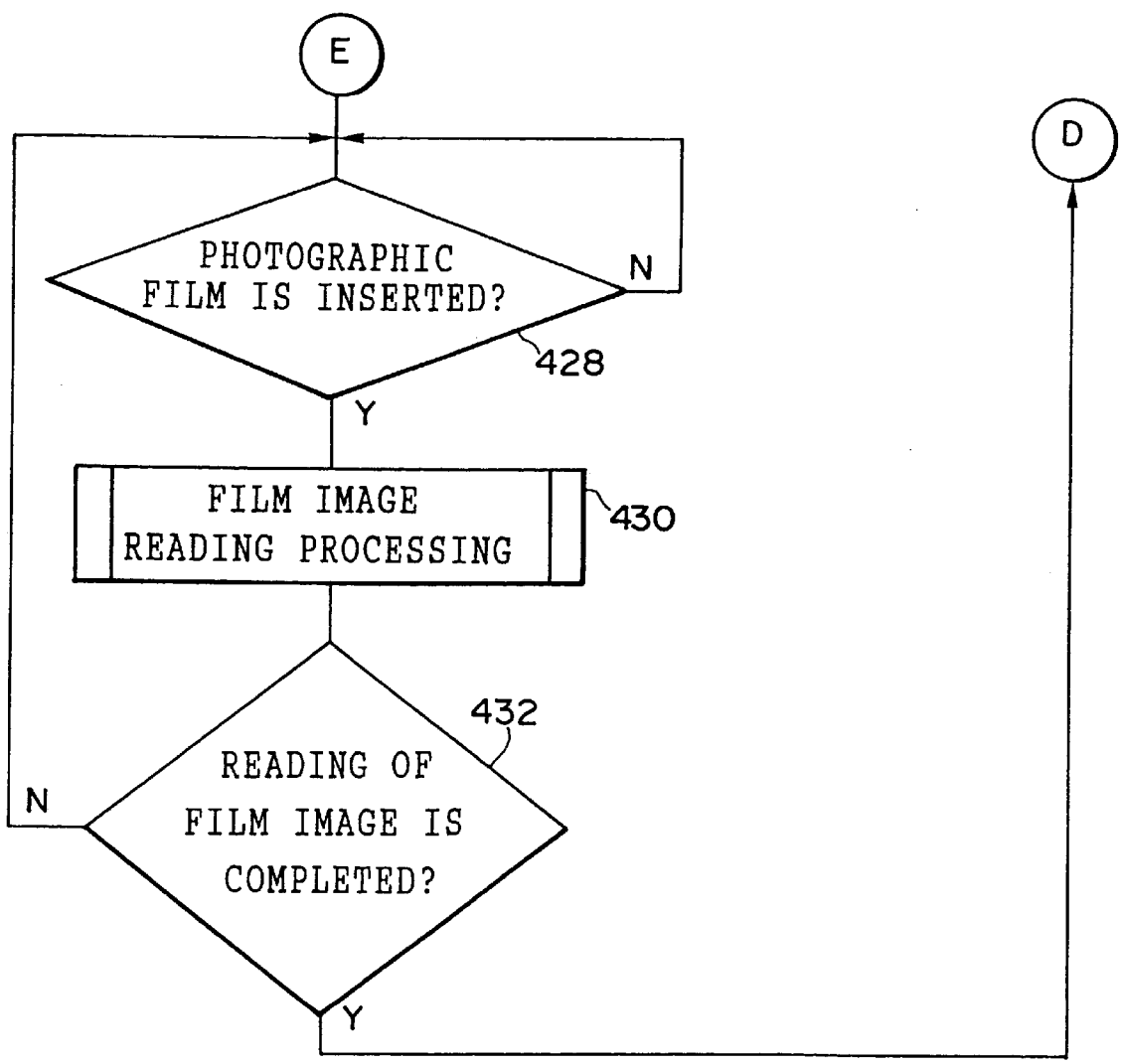

When the power source of the line CCD scanner 14 is turned on, the microprocessor 46 executes line scanner control processing shown in FIGS. 11A to 11C. First, in step 400, the process proceeds to the "initial state mode" in which each operation of the parts is controlled in accordance with the states of the parts set as the "initial state mode".

Namely, the lamp 32 is turned on by the lamp driver 53, the diaphragm 39 is moved to a full-open position by the diaphragm driving motor 56, the lens stop 52 is moved to a full-open position by the lens-stop driving motor 62, and the CCD shutter 52 is moved to a full-open position by the shutter driving motor 64.

In step 402, it is determined whether dark correction of the line CCD 116 is made. When the decision of step 402 is no, the process proceeds to step 404 and it is determined whether light correction of the line CCD 116 is made. When the decision of step 404 is also no, the process proceeds to step 406 and it is determined whether linearity correction of the line CCD 116 is made. When the decision of step 406 is also no, the process proceeds to step 408 and it is determined whether the process proceeds to the power-saving mode. When the decision of step 408 is also no, the process proceeds to step 410 and it is determined whether reading of a film image is effected. When the decision of step 410 is also no, the process returns to step 402 and steps 402 to 410 are repeated.

The dark correction, light correction, and linearity correction are each made periodically (for example, at the time of start-up of one-day operation). When the timing at which the dark correction is executed comes, the decision of step 402 is affirmed and the process proceeds to step 412. In step 412, the process proceeds to the "dark correction mode" to control each operation of the parts in accordance with the states of the parts set as the "dark correction mode". Namely, the lamp 32 is turned off by the lamp driver 53 and the CCD shutter 52 is moved to a full-closed position by the shutter driving motor 64. Further, the turrets 36 and 37 are each rotated to a full-open position (i.e., the position where the hole with a light controlling filter being not fitted into is located on the optical axis) by the turret driving motor 54, the casing 44 and the lens unit 50 are slid by the reading-section driving motor 58 and the lens driving motor 60 so that the zoom magnification of the lens unit 50 becomes 1.0, and the diaphragm 39 is moved to a full-open position by the diaphragm driving motor 56. Moreover, a notice which indicates execution of the dark correction mode is given to the image processing section 16.

As a result, the line CCD 116 is brought into a state of no light made incident thereon. The image processing section 16 stores, as data used for dark correction of the line CCD 116, data inputted from the line CCD scanner 14 (i.e., data into which a signal corresponding to a dark output from the line CCD 116 is subjected to A/D conversion). In step 414, it is determined whether the dark correction mode is completed, and the process is placed in a waiting state until the decision of step 414 is affirmed. When the decision of step 414 is affirmed, the process returns to step 400 and proceeds to the initial state mode, and thereafter, the above-described steps 402 to 410 are repeated.

Further, when the timing at which the light correction is executed comes, the decision of step 404 is affirmed and the process proceeds to step 416. In step 416, the process proceeds to the "light correction mode" to control each operation of the parts in accordance with the states of the parts set as the "light correction mode". Namely, the lamp 32 is turned on by the lamp driver 53, the diaphragm 39 is moved by the diaphragm driving motor 54 to the position ($P_5$) at the time during light correction, the turrets 36 and 37 are each rotated by the turret driving motor 54 to a full-open position, the casing 44 and the lens unit 50 are slid by the reading-section driving motor 58 and the lens driving motor 60 so that the zoom magnification by the lens unit 50 becomes 1.0, the lens stop 51 is moved by the lens-stop driving motor 62 to a full-open position, and the CCD shutter 52 is moved by the shutter driving motor 64 to a full-open position. Further, a notice which indicates execution of the light correction mode is given to the image processing section 16.

As a result, in the image processing section 16, based on the data inputted from the line CCD scanner 14, a gain for light correction is determined for each of the cells of the line CCD 116. In step 418, it is determined whether the light correction mode is completed, and the process is placed in a waiting state until the decision of step 418 is affirmed. When the decision of step 418 is affirmed, the process returns to step 400 and proceeds to the initial state mode, and thereafter, the above-described steps 402 to 410 are repeated.

Further, when the timing at which the linearity correction is executed comes, the decision of step 406 is affirmed and the process proceeds to step 420. In step 420, the process proceeds to the "linearity correction mode" to control each operation of the parts in accordance with the states of the parts set as the "linearity correction mode". Namely, the lamp 32 is turned on by the lamp driver 53, the diaphragm 39 is moved by the diaphragm driving motor 56 to the position ($P_6$) at the time of linearity correction, the turrets 36 and 37 are each rotated to a full-open position by the turret driving motor 54, the casing 44 and the lens unit 50 are slid by the reading-section driving motor 58 and the lens driving motor 60 so that the zoom magnification by the lens unit 50 becomes 1.0, the lens stop 51 is moved by the lens-stop driving motor 62 to a full-open position, and the CCD shutter 52 is moved by the shutter driving motor 64 so that an ND filter is positioned on the optical path. Further, a notice which indicates execution of the linearity correction mode is given to the image processing section 16.

As a result, in the image processing section 16, based on the data inputted from the line CCD scanner 14, a correction value for the linearity correction is determined for each of the cells of the line CCD 116. In step 422, it is determined whether the linearity correction mode is completed, and the process is placed in a waiting state until the decision of step 422 is affirmed. When the decision of step 422 is affirmed, the process returns to step 400 and proceeds to the initial state mode, and thereafter, the above-described steps 402 to 410 are repeated.

Further, when, for example, the process is continuously placed in a non-executed state for a predetermined time or more though the power source of the line CCD scanner 14 is turned on, the decision of step 408 is affirmed and the process proceeds to step 424. In step 424, the process proceeds to the "power-saving mode" to control each operation of the parts in accordance with the states of the parts set as the "power-saving mode". Namely, the lamp 32 is turned off by the lamp driver 53 (or may be turned on at a low duty ratio), and the diaphragm 39 is moved by the diaphragm driving motor 56 to a full-closed position. As a result, power consumption of the line CCD scanner 14, of which operation is placed in a waiting state without being executed, is reduced.

In step 426, it is determined whether the power-saving mode is completed, and the process is placed in the waiting state until the decision of step 426 is affirmed. When an instruction for execution of any process is given, the decision of step 426 is affirmed and the process returns to step 400 and proceeds to the initial state mode, and thereafter, the above-described steps 402 to 410 are repeated.

Figure 12A:
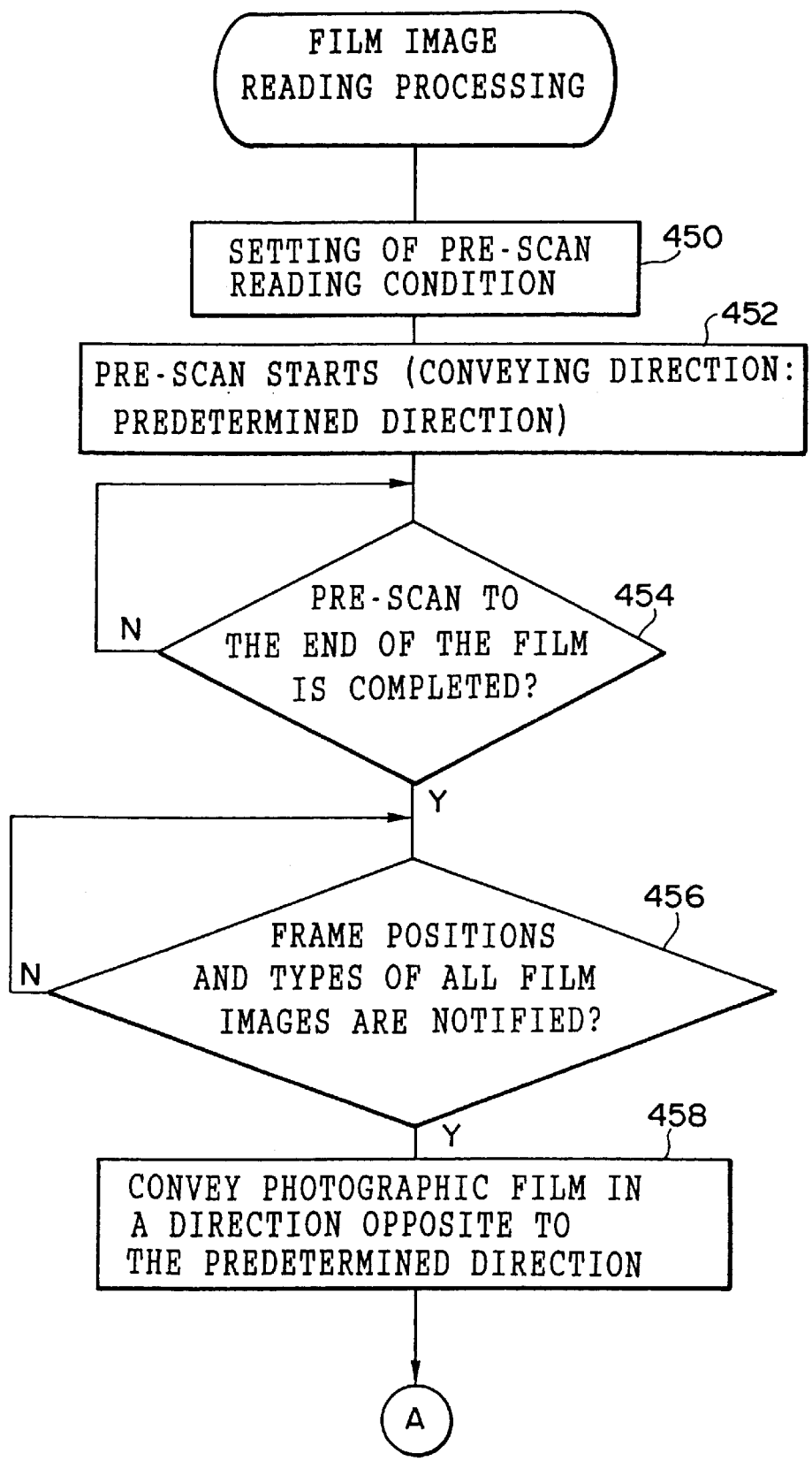
Figure 12C:
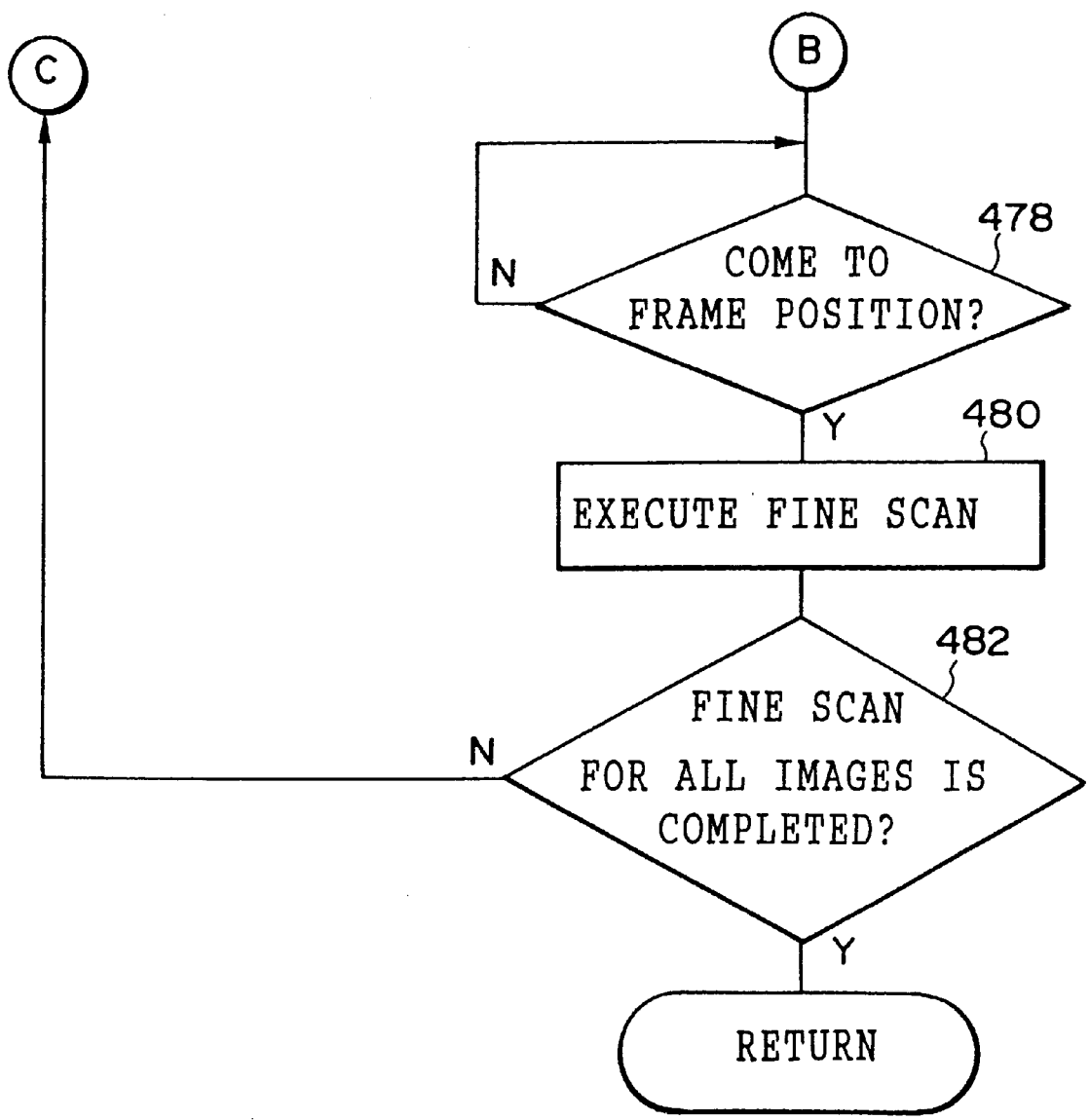

Further, when an instruction for reading a film image is given by an operator, the decision of step 410 is affirmed and the process proceeds to step 428. In step 428, it is determined whether the photographic film 22 to be read is inserted in the film carrier 38, and the process is placed in the waiting state until the decision of step 428 is affirmed. When the leading end of the photographic film 22 to be read is inserted in the insertion opening 304 of the film carrier 38 and it is detected by the leading-end detecting sensor 310, the decision of step 428 is affirmed and the process proceeds to step 430, in which the film image reading operation is effected. The film image reading processing will be hereinafter described with reference to the flowchart shown in FIGS. 12A to 12C.

In step 450, the process proceeds to the "pre-scan mode" to control each operation of the parts in accordance with the states of the parts set as the "pre-scan mode" so that pre-scan for the photographic film 22 is effected under a predetermined reading condition. Namely, the lamp 32 is turned on by the lamp driver 53, the diaphragm 39 is moved by the diaphragm driving motor 56 to the position ($P_O$) at the time of pre-scan, the turrets 36 and 37 are each rotated to a full-open position by the turret driving motor 54, the casing 44 and the lens unit 50 are slid by the reading-section driving motor 58 and the lens driving motor 60 so that the zoom magnification by the lens unit 50 becomes 1.0, the lens stop 51 is moved to a full-open position by the lens-stop driving motor 62, and the CCD shutter 52 is moved by the shutter driving motor 64 to a full-open position. Further, the timing generator 74 is set at a minimum value, t, of the operating time of the electronic shutter of the line CCD 116 (i.e., a reading cycle of the line CCD 116 per line unit, i.e., a charge accumulation time), and the film carrier 38 is set at the maximum value, 5×v, of the conveying speed of the photographic film 22. Accordingly, the pre-scan for the photographic film 22 is effected at high speed at a relatively low resolution and is completed in a short time.

In the subsequent step 452, pre-scan processing starts in such a manner that an instruction for conveying the photographic film 22 in a predetermined direction (i.e., the direction indicated by arrow A in FIG. 6) is given to the film carrier 38, the photographic film 22 conveyed at the maximum conveying speed (5×v) is read by the line CCD 116 at a shortest reading cycle (t), signals outputted from the line CCD 116 are sequentially subjected to A/D conversion and outputted as pre-scan data to the image processing section 16. In step 454, it is determined whether pre-scan for the photographic film 22 to the end is completed, and the process is placed in the waiting state until the decision of step 454 is affirmed.

The above-described steps 450 to 454 correspond to preliminary-reading control means of the present invention. During the pre-scan, a frame position of a film image on the photographic film 22 is unknown, but the entire surface of the photographic film 22 is read by the line CCD 116 without determining the frame position and without separating an image portion and a non-image portion on the photographic film 22.

Further, the pre-scan allows reading of the entire surface of the photographic film 22. Therefore, a white-point portion is also included in the reading range and the size and density of each film image are unknown. Further, there is a possibility that a film image having a low density near a white-point state or an image of which a portion is set in a white-point state (for example, an image of panorama size recorded on a negative film) and that saturation of accumulated charge occurs in the line CCD 116. For this reason, the position ($P_O$) of the diaphragm 39 during pre-scan is set at a position near a full-closed state. As a result, even when light transmitted through the white-point portion on the photographic film 22 is made incident on the line CCD 116, occurrence of saturation of accumulated charge in the line CCD 116 is prevented.

Figure 13B:
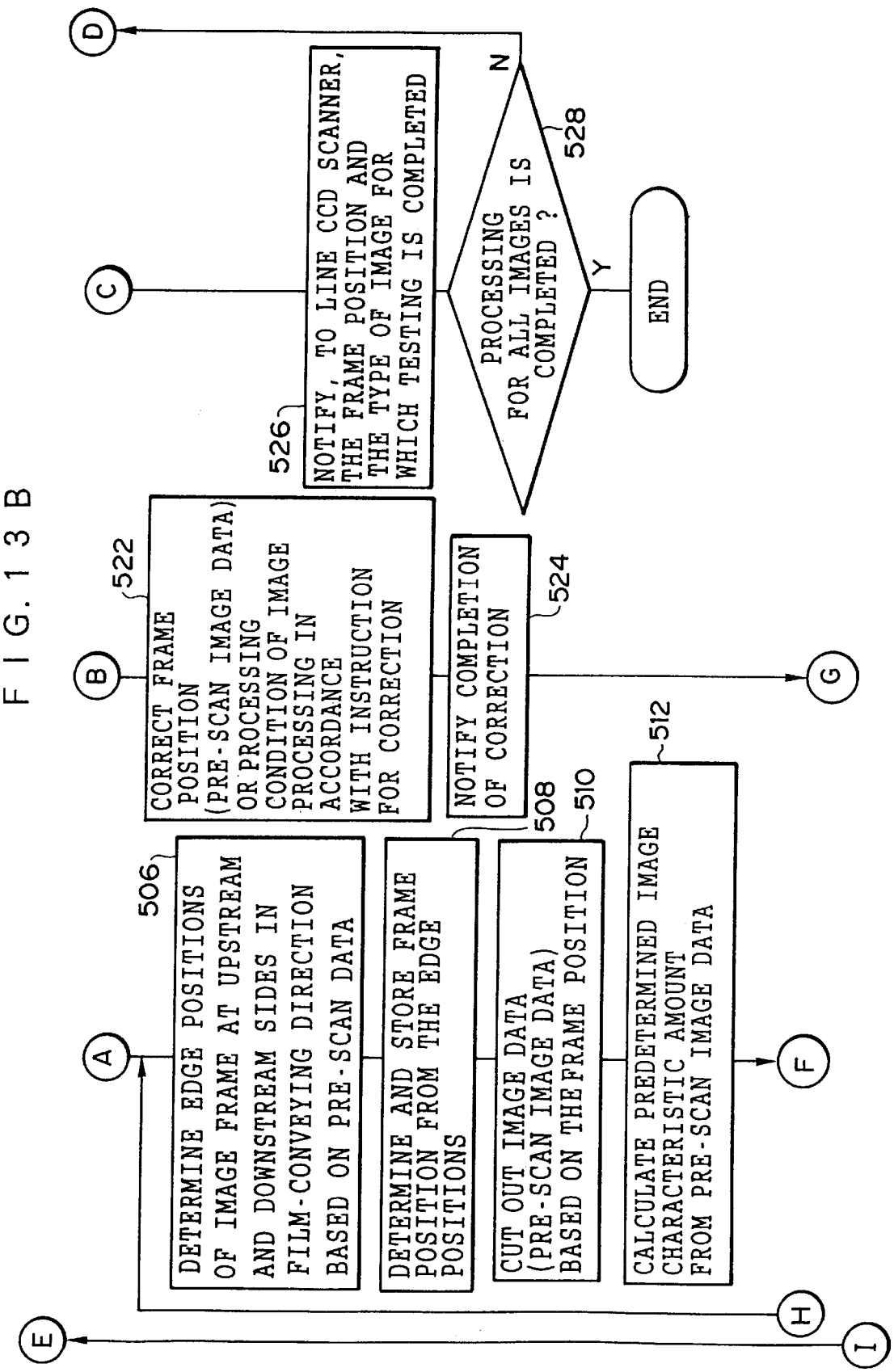
Figure 13C:
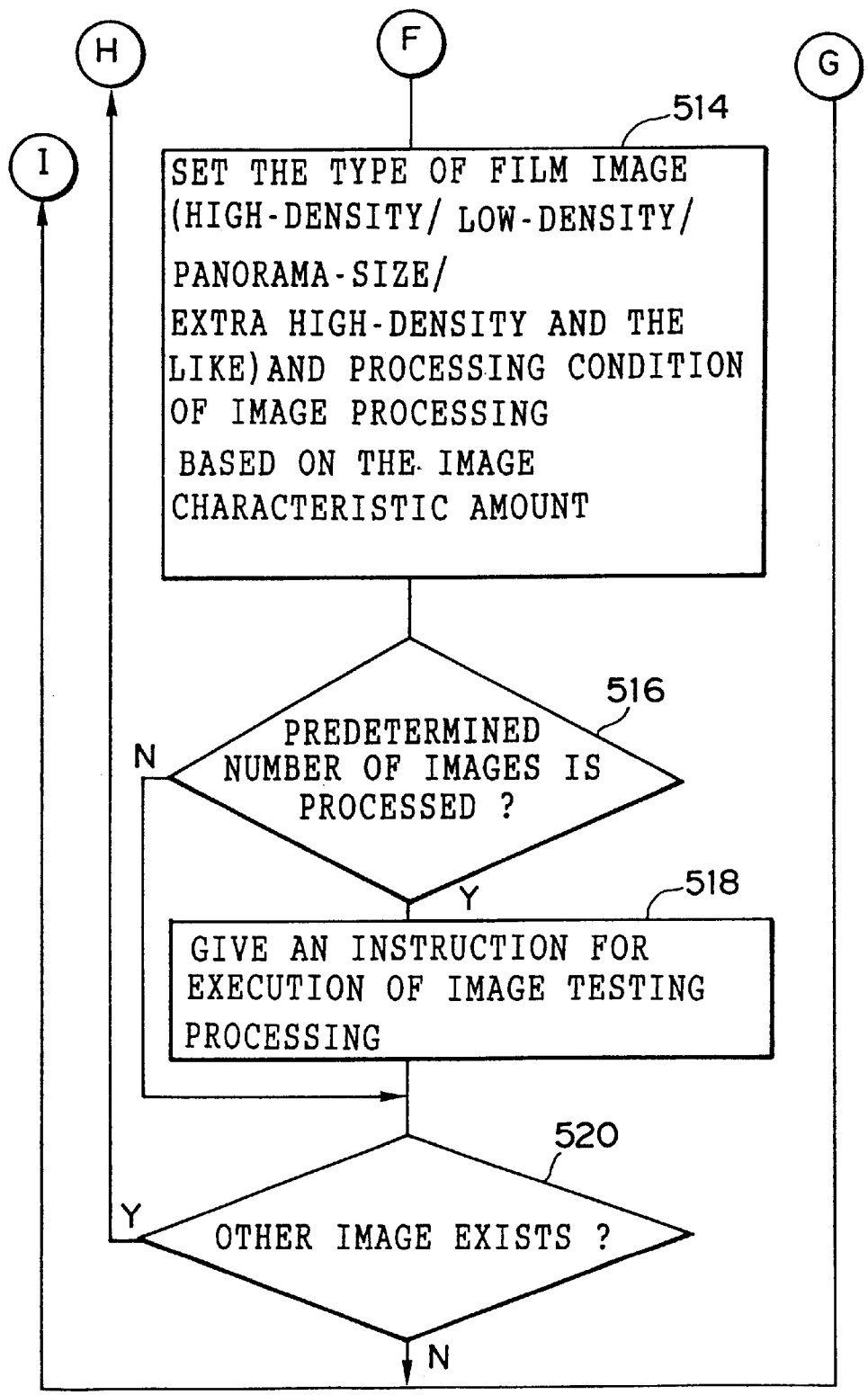

On the other hand, when the line CCD scanner 14 starts pre-scan to start inputting pre-scan data from the line CCD scanner 14 to the image processing section 16, the CPU 146 of the automatic set-up engine 144 allows the pre-scan data inputted via the line scanner correcting portion 122 and the selector 132 to be sequentially stored in the RAM 148, and concurrently therewith, automatic set-up processing is effected. The automatic set-up processing will be described hereinafter with reference to the flowchart shown in FIGS. 13A to 13C.

In step 500, it is determined whether at least a predetermined amount of unprocessed pre-scan data is accumulated in the RAM 148. When the decision of step 500 is no, the process proceeds to step 502, in which it is determined whether a correction instruction (which will be described later) is inputted from the personal computer 158. When the decision of step 502 is also no, the process proceeds to step 504, in which it is determined whether the completion of testing (which will be described later) is notified from the personal computer 158. When the decision of step 504 is also no, the process returns to step 500 and the above-described steps 500 to 504 are repeated until the decision of any of these steps is affirmed.

When at least a predetermined amount of unprocessed pre-scan data is accumulated in the RAM 148, the decision of step 500 is affirmed and the process proceeds to step 506, in which based on the pre-scan data accumulated in the RAM 148, edge positions of a film image recorded on the photographic film 22 at both sides along the conveying direction of the photographic film 22 (i.e., upstream and downstream sides of the film image) are determined. Step 506 corresponds to the determination means of the present invention.

For example, as proposed by the present inventors in Japanese Patent Application Laid-Open (JP-A) Nos. 8-304932, 8-304933, 8-304934, and 3-304935, the determination of edge positions can be effected in such a manner that based on respective density values of pixels represented by pre-scan data, a density variation value along the longitudinal direction of the photographic film is calculated for each of the pixels, the respective density variation values along the longitudinal direction of the film calculated for the pixels are integrated per line unit along the transverse direction of the film, and integrated values obtained per line unit are compared. Further, when the photographic film 22 is an APS film, the region at an inner side of the positions of perforations formed, in which edges may exist, is set as a search range, and search for edges within the search range allows reduction of the time required for the determination of edge positions.

In the subsequent step 508, based on the determined edge positions, the frame position of the film image is determined so as to correspond to the positions of the perforations, and the like, and the determined frame position is stored in the RAM 148. In step 510, based on the determined edge positions or frame position, data in the region where the film image is recorded (i.e., pre-scan image data) is cut out from the pre-scan data stored in the RAM 148 and is stored in the RAM 148 (corresponding to the cut-out means of the third aspect of the present invention). In step 512, predetermined image characteristic amounts of the film image are calculated from the cut-out pre-scan image data. Meanwhile, the predetermined image characteristic amounts include a color balance value of the film image (specifically, the ratio of the minimum density value (maximum luminance value) for each of the component colors of the film image).

In the subsequent step 514, based on the calculated image characteristic amounts, the type (i.e., size or density type) of the film image and a processing condition of image processing for the fine-scan image data are set by calculation. Meanwhile, in the case of fine-scan which will be described later, the reading condition changes depending on the type of the film image, and therefore, among the operations of step 514, the operation for setting the type of the film image corresponds to the reading-condition setting means of the present invention and the operation for setting the processing condition of image processing corresponds to the processing-condition calculating means according to the third aspect of the present invention.

When the photographic film 22 to be read is a photographic film in 135 magazines, the size (in this case, the frame size) of a film image of standard size is determined within an image recording range and the size of a film image of nonstandard size such as panorama size is determined based on whether the density or hue of a predetermined portion which is not included in the image recording range is that corresponding to an unexposed portion (in the case of a negative film, the white-point portion).

Further, as disclosed in Japanese Patent Application Laid-Open (JP-A) Nos. 8-304932, 8-304933, 8-304934, and 8-304935, the size of the film image (i.e., the aspect ratio thereof) may be determined in such a manner that, based on respective density values of the pixels represented by the pre-scan image data, a density variation value along the transverse direction of the film is calculated for each of the pixels, the density variation values along the transverse direction of the film calculated for the pixels are integrated per line unit, and the integrated values respectively obtained for the lines are compared. Alternatively, the size of the film image may be determined by setting a threshold value from a density histogram to digitize the image and also based on the ratio of existence of the image in each of regions of the image, or may be determined based on dispersion and the average of density variation values in the predetermined portion, or further may be determined by using a combination of the above methods.

Further, when the photographic film 22 to be read is an APS film, the size of the film image (in this case, a print size) can be determined by reading the print size magnetically recorded as data on a magnetic layer of the APS film.

The density type of the film image can be classified into low density, normal density, high density, extra-high density, and the like, by comparing average density, maximum density, minimum density, and the like, with a predetermined value. Further, as the processing conditions for image processing, there are calculated, for example, an enlargement/reduction ratio of an image, a processing condition for image processing such as hyper-tone or hyper-sharpness (specifically, the condensation of gradation to an extra-low frequency luminance component of an image, a gain (rate of highlight) to a high-frequency component or an intermediate-frequency component of an image), a gradation conversion condition, and the like.

When the determination of edge positions, the cut-out of the pre-scan image data, and the setting of the type and the processing condition for image processing are effected for a single film image as described above, the process proceeds to step 516, in which it is determined whether the above-described processes are effected for each of a predetermined number of film images (for example, six frames) is effected.

When the decision of step 516 is no, the process proceeds to step 520, in which it is determined whether other film images exist among unprocessed pre-scan data accumulated in the RAM 148. When the decision of step 520 is yes, the process returns to step 506 and steps 506 to 520 are repeated. When the decision of step 520 is no, the process returns to step 500 and steps 500 to 504 are repeated. Subsequently, when at least a predetermined amount of unprocessed pre-scan data is newly accumulated in the RAM 148, the decision of step 500 is affirmed and steps 506 to 520 are repeated.

Figure 14A:
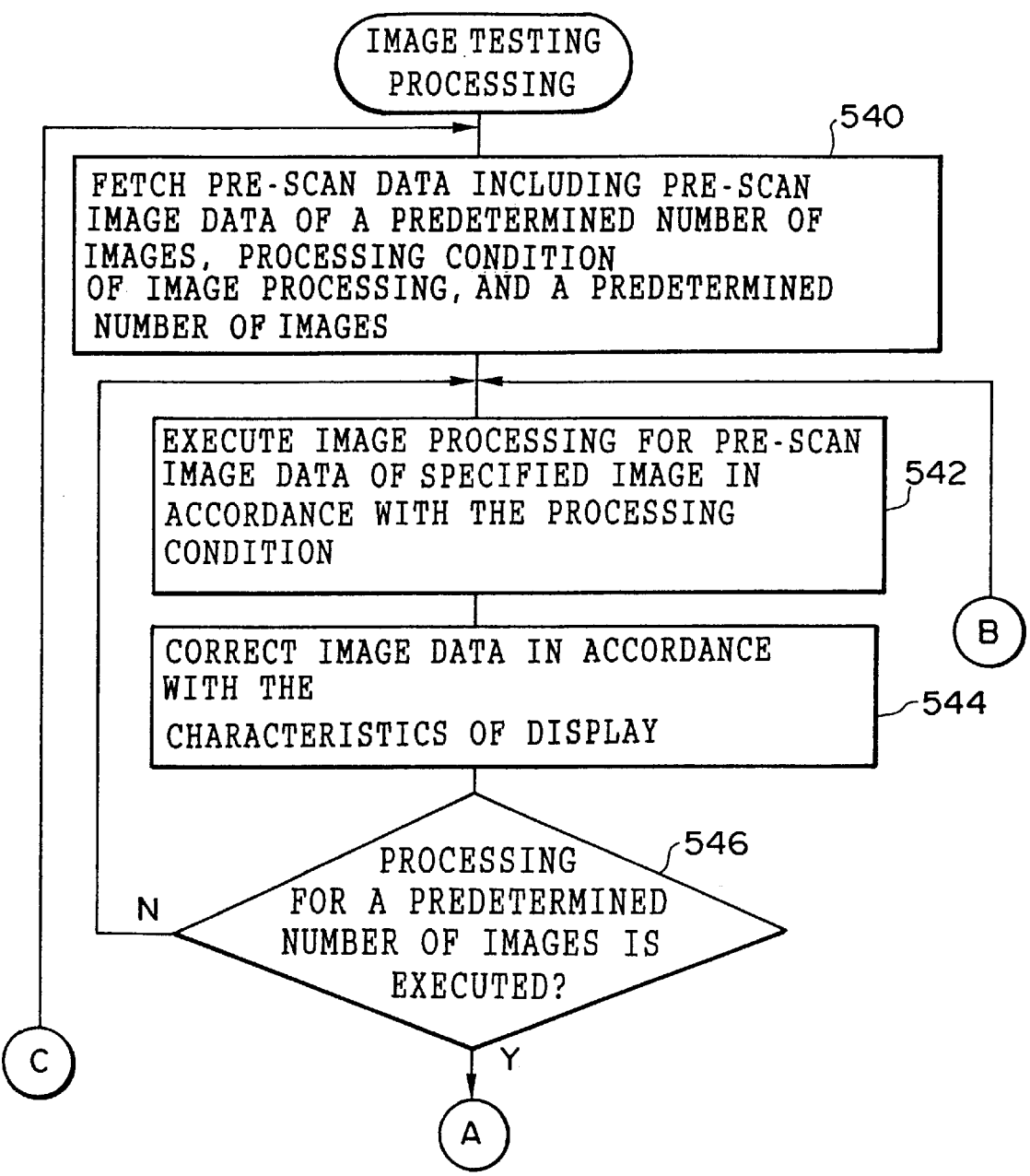
FIGS. 14A, 14B, and 14C show a flow chart which indicates an image testing operation executed by a personal computer of the image processing section.
Figure 14B:
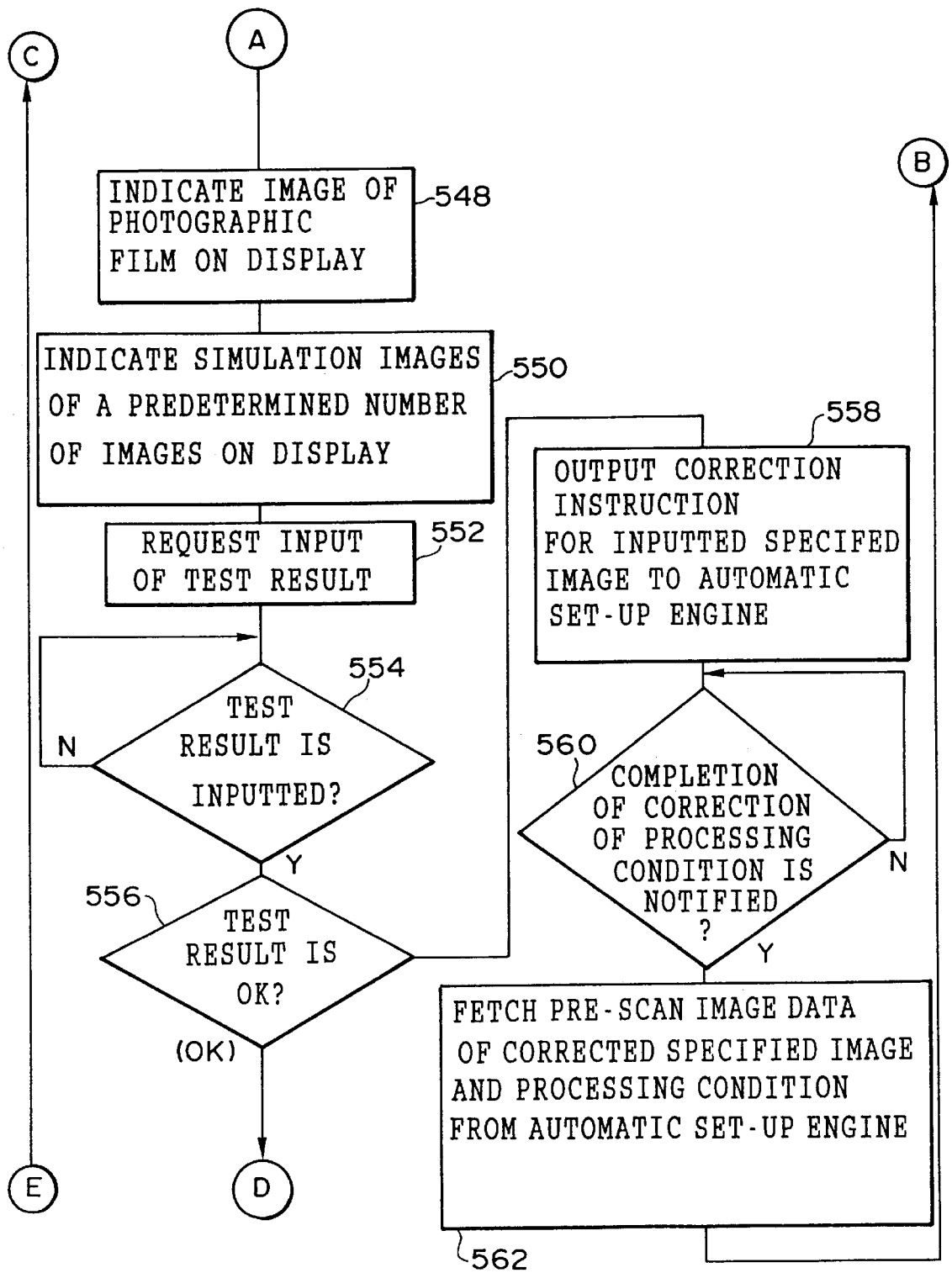
Figure 14C:
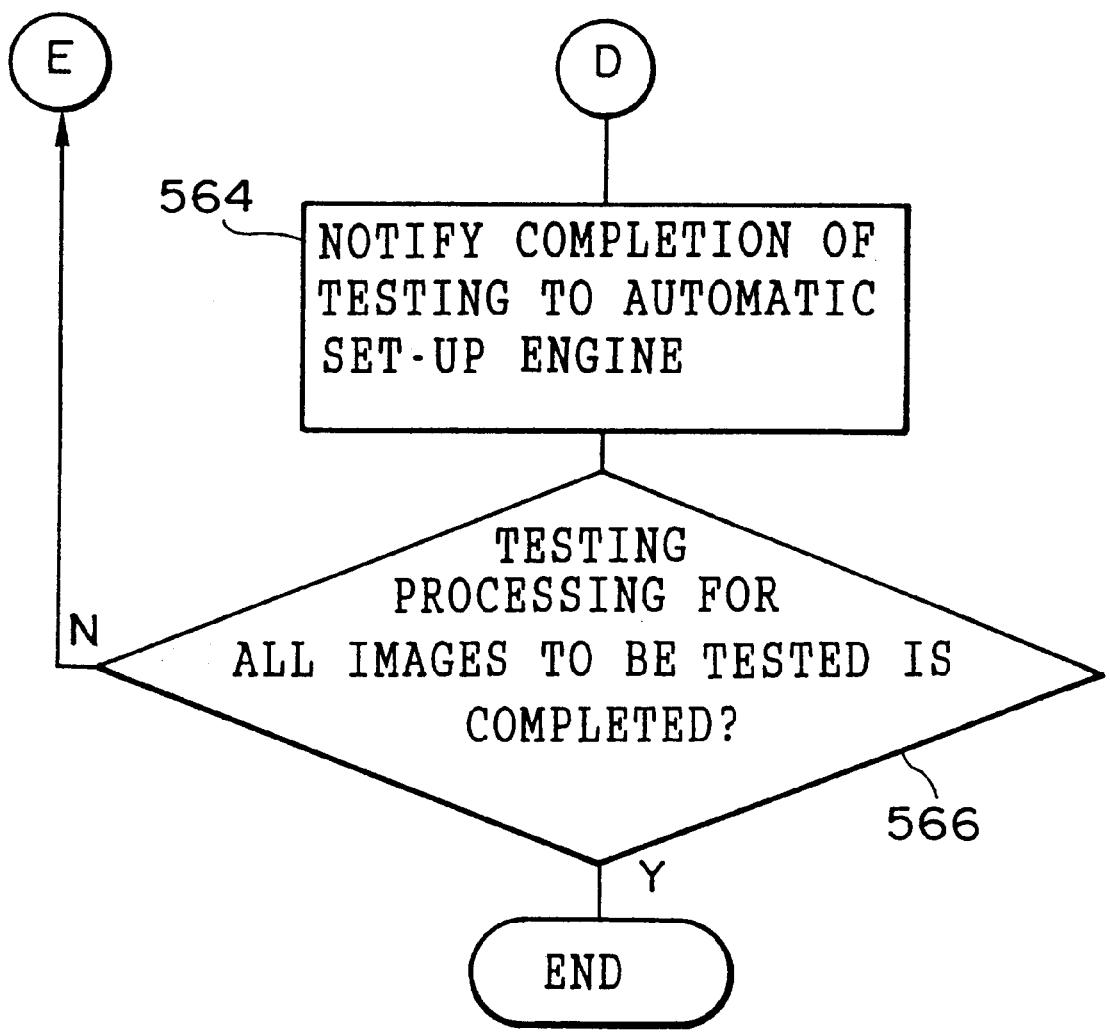

Further, when the determination of edge positions, the cut-out of the pre-scan image data, and the setting of the type and the processing condition for image processing are effected for each of the predetermined number of film images, the decision of step 516 is affirmed. In step 518, an instruction for execution of image testing processing is given to the personal computer 158, and thereafter, the process proceeds to step 520. As a result, the CPU 160 of the personal computer 158 executes image testing processing. The image testing processing will be hereinafter described with reference to the flowchart shown in FIGS. 14A to 14C.

In step 540, pre-scan image data of a predetermined number of film images and processing conditions for image processing are fetched from the automatic set-up engine 144 and pre-scan data corresponding to a range on the photographic film 22 to be read, where the predetermined number of film images are recorded, is also fetched from the automatic set-up engine 144.

In the subsequent step 542, the pre-scan image data of any one film image and the processing condition for image processing thereof are fetched from the previously fetched pre-scan image data of the predetermined number of film images and processing conditions for image processing, and predetermined image processing (i.e., enlargement and reduction of an image, gradation conversion, hyper-tone processing, hyper-sharpness processing, and the like) is effected for the fetched pre-scan image data in accordance with the fetched processing condition. The predetermined image processing is equivalent to that which is effected for fine-scan image data by the image processor 140. However, the pre-scan is used to read the film image at a resolution which is lower than the fine-scan and the amount of pre-scan image data is smaller than that of fine-scan image data. For this reason, the image processing in step 542 is completed in a relatively short time.

In step 544, the image data subjected to the image processing is corrected in accordance with the characteristic of the display 164 which allows display of an image and the corrected data (simulation image data) is temporarily stored in the memory 162. In step 546, it is determined whether the above-described processing is effected for each of the predetermined number of film images. When the decision of step 546 is no, the process returns to step 542, and among the predetermined number of images of which pre-scan image data and processing conditions are fetched in step 540, steps 542 to 544 are effected repeatedly for each of film images which have not been subjected to the image processing.

Figure 15:
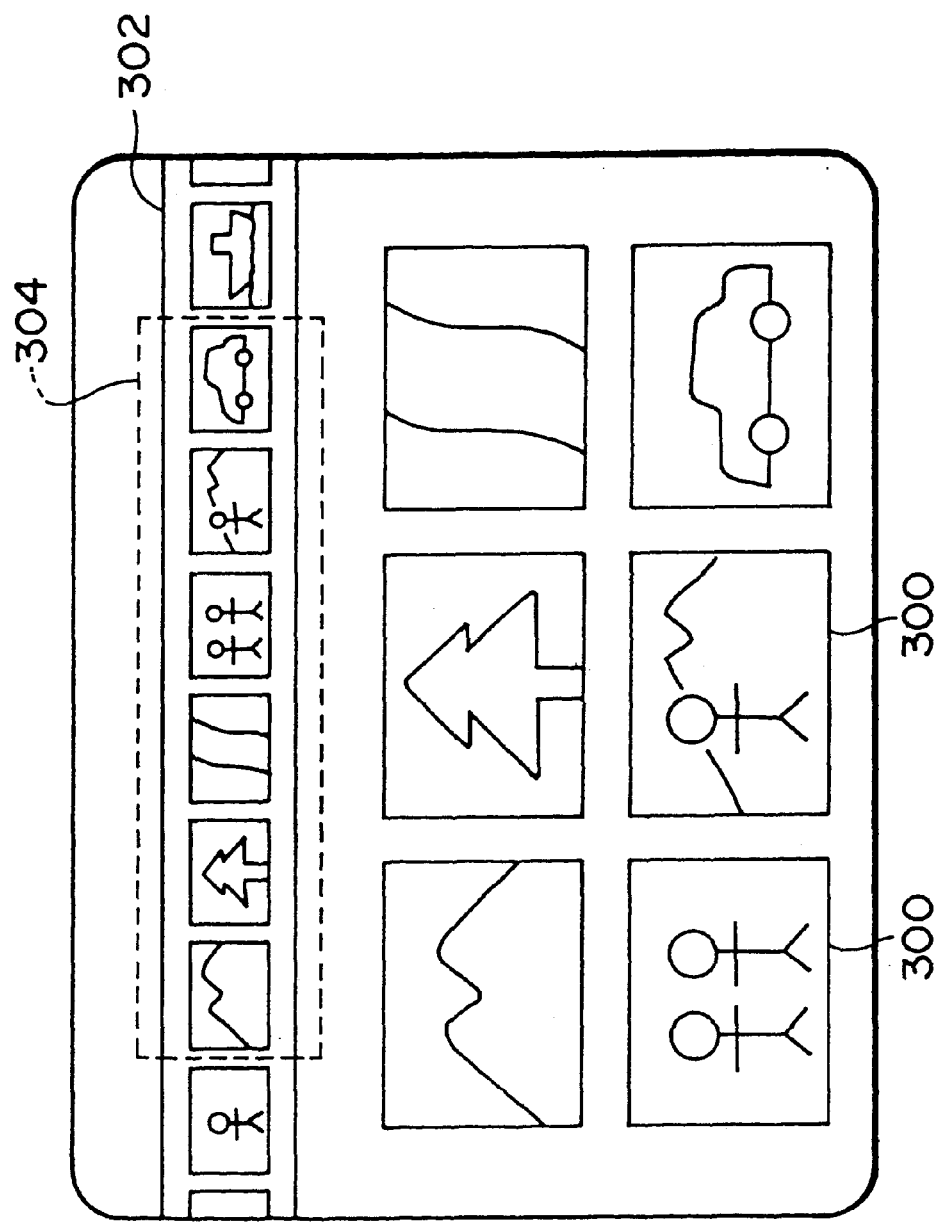
FIG. 15 is an image diagram which shows an example of a simulation image on a display.

When the decision of step 546 is affirmed, the process proceeds to step 548. In step 548, with the pre-scan data fetched in step 540 used, for example, as shown in FIG. 15, the range on the photographic film 22 to be read, in which the predetermined number of film images are recorded, is shown as an image 302 on the display 164. In the subsequent step 550, based on simulation image data of the predetermined number of film images, a predetermined number of simulation images 300 which indicate the results of the image processing under the processing conditions set by the automatic set-up engine 144 are shown on the display 164 for the image data of the predetermined number of film images. The above-described steps 540 to 550 correspond to the display control means according to the third and fourth aspects of the present invention.

Meanwhile, FIG. 15 shows that, on the photographic film shown as the image 302, film images corresponding to the indicated simulation images 300 are enclosed by a frame 304. The display of simulation images is not limited to the example shown in FIG. 15. Each time an instruction for changing a display image is given by the operator, a predetermined number of simulation images may be sequentially indicated for each frame. Although the film images corresponding to the indicated simulation images 300 are indicated in such a state as to be enclosed by the frame 304, these film images may be indicated with the peripheral color changed.

In step 552, with a message which requests testing of the simulation images by the operator being shown on the display 164, the request for testing of the simulation images is given to the operator.

As a result, the operator visually confirms the simulation images shown on the display 164 and effects a testing operation which inputs the results of various determinations. Namely, it is first determined whether the frame position of the film image determined in the automatic set-up engine 144 is proper. When it is determined that the frame position is proper, a determination is made about whether the quality of the simulation images is proper (i.e., whether the processing condition calculated in the automatic set-up engine 144 is proper). When it is determined that the quality of the image (i.e., the processing condition) is not proper, the way to correct the processing condition is determined.

When it is determined that the frame position and the quality of each of all simulation images shown are proper, the information which indicates "testing is OK" as the test result is inputted via the keyboard 166. When it is determined that the frame position of a specified simulation image is not proper, the information which indicates the way to correct the frame position of the specified simulation image is inputted, as the test result, via the keyboard 166. When it is determined that the image quality of a specified simulation image is not proper, the information which indicates correction of the processing condition for a specified film image corresponding to the specified simulation image is inputted, as the test result, via the keyboard 166.

For example, a film image photographed by using a stroboscope or a film image with a scene of backlight photographed has an extremely high contrast and a washed-out portion or a flat portion of background for a main subject occurs on the simulation image. In this case, the operator inputs, as the information which indicates correction of the processing condition, the information which indicates correction of the rate of highlight with respect to a high-luminance data among extra-low frequency luminance components of the image so that the gradation in only the region corresponding to the background of an image is compressed, i.e., so that the condensation of gradation of an extra-low frequency light component (i.e., a high-luminance region of extra-low frequency luminance components extracted from the image) of the image subjected to hyper-tone processing becomes higher.

Further, for example, when the simulation image lacks sharpness, the operator inputs, as the information which indicates correction of the processing condition, the information which indicates correction of the rate of highlight with respect to the high-frequency components of the image, and the like so as to allow highlighting of sharpness. For example, in the case of an underexposed or overexposed film image, the density of a simulation image entirely deflects toward high density or low density, or the contrast of the simulation image becomes extremely low. In this case, the operator inputs, as the information which indicates correction of the processing condition, information which indicates correction of a conversion curve of a gradation conversion condition so that the entire density or contrast becomes proper.

In the subsequent step 554, it is determined whether the test results are inputted by the operator via the keyboard 166 and the process is placed in the waiting state until the test results are inputted. When the test results are inputted, the process proceeds to step 556, in which the content of the information inputted as the test result is determined. When the information which indicates correction of the frame position or the processing condition is inputted, as the test results, to a specified film image corresponding to a specified simulation image, the process proceeds to step 558 and an instruction for correction of the frame position or the processing condition with respect to the inputted specified film image is outputted to the automatic set-up engine 144. In step 560, it is determined whether a completion of correction of the frame position or the processing condition of the specified film image is notified by the automatic set-up engine 144 and the process is placed in the waiting state until the decision of step 560 is affirmed.

When the above-described instruction for correction is inputted, in the automatic set-up engine 144, the decision of step 502 in the automatic set-up processing (see FIGS. 13A to 13C) is affirmed and the process proceeds to step 522. In step 522, correction processing which corresponds to the instruction for correction inputted from the personal computer 158 is effected.

Namely, when the inputted instruction for correction is an instruction for correcting the frame position of the specified film image, the frame position of the specified film image is corrected in accordance with the correction instruction (corresponding to the determination means according to the third aspect of the present invention), and thereafter, in the same manner as in the above-described steps 510 to 514, pre-scan image data is cut out again from the pre-scan data in accordance with the corrected frame position, a predetermined image characteristic amount is calculated from the cut-out pre-scan image data, and the type and the processing condition for image processing of the specified film image are reset by calculation. The above-described correction of the frame position can make it possible to reliably read an image section on the photographic film 22 during fine scan.

Further, when the inputted correction instruction is an instruction for correcting the processing condition of the specified film image, only correction of the processing condition of the specified film image is effected. For example, so long as the instruction for correction of the processing condition is an instruction which corrects the rate of highlight with respect to a specified frequency component, among the processing conditions for image processing, the rate of highlight with respect to the corresponding frequency component is corrected. Further, so long as the instruction for correction of the processing condition is an instruction for correcting the conversion curve of a gradation conversion condition, among the processing conditions for image processing, the conversion curve which indicates the gradation conversion condition is entirely or partially corrected in accordance with the correction instruction. This operation corresponds to the processing-condition calculating means according to the fourth aspect of the present invention. As a result, the processing condition suitable for each of the film images can be reliably set.

When the correction of frame position or processing condition is completed as described above, in step 524, the corrected processing condition is stored in the RAM 148 or the like, and the completion of correction of the frame position or the processing condition with respect to the specified film image is notified to the personal computer 158. Subsequently, the process proceeds to step 500 and steps 500 to 504 are repeated.

When the completion of correction of the frame position or the processing condition is notified by the automatic set-up engine 144 as described above, in the personal computer 158, the decision of step 560 in the image testing processing (see FIGS. 14A to 14C) is affirmed and the process proceeds to step 562. In step 562, the pre-scan data image data and processing condition of the specified film image of which frame position or processing condition has been corrected are fetched from the automatic set-up engine 144, and the process proceeds to step 542.

As a result, the operations of steps 542 and 544 are executed again for the specified film image of which frame position or processing condition has been corrected, and the simulation image of the specified film image is shown again on the display 164. Then, with the simulation image of the regenerated specified film image being visually confirmed by the operator, it is possible for the operator to determine whether the content of the previously inputted correction instruction is proper.

Steps 542 to 562 are repeated until it is determined by the operator that the frame position and quality of each of all simulation images shown on the display 164 are proper and the information which represents "testing is OK" as the test result is inputted (i.e., until the decision of step 556 is affirmed), and the frame position or processing condition of each of film images corresponding to the displayed simulation images are corrected in accordance with the instruction from the operator. When the information which represents "testing is OK" is inputted by the operator via the keyboard 166 and the decision of step 556 is affirmed, the process proceeds to step 564 and a notice of completion of testing processing is given to the automatic set-up engine 144. As a result, the testing processing for the predetermined number of film images is completed.

In the subsequent step 566, it is determined whether the testing processing is effected for all film images to be tested (all film images recorded on the photographic film 22 to be read). When the decision of step 566 is no, the process returns to step 540 and the operation of step 540 and subsequent operations are repeated. As a result, the above-described image testing processing is effected, with a predetermined number of film images set as a unit, for all film images recorded on the photographic film 22 to be read, and it is determined whether the frame position determined or the calculated processing condition by the automatic set-up engine 144 is proper, and further, the frame position or processing condition is corrected as occasion demands.

Further, in the automatic set-up engine 144, when the completion of testing is notified, the decision of step 504 in the automatic set-up processing (see FIGS. 13A to 13C) is affirmed and the process proceeds to step 526. In step 526, for the predetermined number of film images for which testing has been completed, the frame position and type of each of the film images, and a color balance value of the film image calculated in step 512 are notified to the line CCD scanner 14. In the subsequent step 528, it is determined whether processing for all film images recorded on the photographic film 22 to be read is completed. When the decision of step 528 is no, the process returns to step 500 and steps 500 to 504 are repeated.

Accordingly, each time the completion of testing is notified from the personal computer 158, in step 526, the frame positions, types, and color balance values of the predetermined number of film images for which testing has been completed are notified to the line CCD scanner 14. When the testing processing for all film images recorded on the photographic film 22 to be read is completed and the frame positions, types, and color balance values of all film images are notified to the line CCD scanner 14, the decision of step 528 is affirmed and the automatic set-up processing is completed.

On the other hand, when pre-scan for the photographic film 22 to be read to the end thereof is effected in the line CCD scanner 14, the decision of step 454 in the film image reading processing (see FIGS. 12A to 12C) is affirmed and the process proceeds to step 456. In step 456, it is determined whether the frame position, type, and color balance value of all film images recorded on the photographic film 22 to be read are notified by the automatic set-up engine 144 of the image processing section 16, and the process is placed in the waiting state until the decision of step 456 is affirmed. When the decision of step 456 is affirmed, the process proceeds to step 458. In step 458, in order to effect fine scan for the film image, an instruction for conveying the photographic film 22 in the direction opposite to the predetermined direction (i.e., the direction indicated by arrow B in FIG. 6) is given to the film carrier 38.

In step 460 and subsequent steps, each operation of the parts of the line CCD scanner 14 is controlled so that fine-scan of the film image is effected under the reading condition suitable for the type of a film image to be next subjected to fine scan. Namely, in step 460, the type of film image to be next subjected to fine scan (in this case, a film image which first reaches the reading position when the photographic film 22 is conveyed in the direction opposite to the predetermined direction) is fetched and it is determined whether the film image is of the type of "high-density frame". When the decision of this determination is affirmed, in step 462, the process proceeds to the "fine-scan mode (high-density frame)" and each operation of the parts of the line CCD scanner 14 is controlled in accordance with the states of the parts set as the "fine-scan mode (high-density frame)" and the process proceeds to step 478.

Namely, the lamp 32 is turned on, the diaphragm 39 is moved to the position during fine scan of a high-density frame ($P_1$), the turrets 36 and 37 are rotated so that the light controlling filter corresponding to the color balance value of the film image is positioned on the optical path (in Table 1, each position of the turrets 36 and 37 at this time is indicated as $P_1$ for convenience' sake, the casing 44 and the lens unit 50 are slid so that the zoom magnification by the lens unit 50 becomes 1.0, and the lens stop 51 and the CCD shutter 52 are each moved to the full-open position. Further, the timing generator 74 is set at "t" which is the operating time of the electronic shutter of the line CCD 116 (i.e., a reading cycle of the line CCD 116), and the film carrier 38 is set at "v" which is the conveying speed of the photographic film 22. A high-density film image has a small amount of light transmitted therethrough. Accordingly, in order that the high-density film image be read with high accuracy in a high dynamic range, the position of the diaphragm 39 ($P_1$) during fine scan of a high-density frame is located near the full-open position.

Further, when the decision of step 460 is no, the process proceeds to step 464 and it is determined whether the film image to be next subjected to fine scan is of the type of "low-density frame". When the decision of step 464 is affirmed, in step 466, the process proceeds to the "fine-scan mode (low-density frame)" and each operation of the parts is controlled in accordance with the states of the parts set as the "fine-scan mode (low-density frame)". Thereafter, the process proceeds to step 478.

In other words, the lamp 32 is turned on, the diaphragm 39 is moved to the position during fine scan of a low-density frame ($P_2$), the turrets 36 and 37 are rotated so that the light controlling filter corresponding to the color balance value of the film image is positioned on the optical path (in Table 1, each position of the turrets 36 and 37 at this time is indicated as "$P_2$" for convenience' sake), the casing 44 and the lens unit 50 are slid so that the zoom magnification by the lens unit 50 becomes 1.0, and the lens stop 51 and the CCD shutter 52 are each moved to the full-open position. Further, the timing generator 74 is set at "t" which is the operating time of the electronic shutter of the line CCD 116 (i.e., a reading cycle of the line CCD 116), and the film carrier 38 is set at "v" which is the conveying speed of the photographic film 22. A low-density film image has a large amount of light transmitted therethrough. Accordingly, in order that the low-density film image be read without causing saturation of charge accumulated in the line CCD 116, the position of the diaphragm 39 ($P_2$) during fine scan of the low-density frame is located so that the amount by which light is decreased by the diaphragm 39 relatively increases.

Further, when the decision of step 464 is no, the process proceeds to step 468 and it is determined whether the type of a film image to be next subjected to fine scan is a "panorama frame". When the decision of step 468 is yes, in step 470, the process proceeds to "fine-scan mode (panorama frame)" and each operation of the parts is controlled in accordance with the states of the parts set as the "fine-scan mode (panorama frame)". Thereafter, the process proceeds to step 478.

Namely, the lamp 32 is turned on, the diaphragm 39 is moved to the position ($P_3$) during fine scan of the panorama frame, the turrets 36 and 37 are rotated so that the light controlling filter corresponding to the color balance value of the film image is positioned on the optical path (in Table 1, each position of the turrets 36 and 37 is indicated as "$P_3$" for convenience' sake), the casing 44 and the lens unit 50 are slid so that the zoom magnification by the lens unit 50 becomes 1.3, the lens stop 51 is moved to the position ($P_1$) during fine scan of the panorama frame, and the CCD shutter 52 is moved to the full-open position. Further, the timing generator 74 is set at "t" which is the operating time of the electronic shutter of the line CCD 116 (i.e., a reading cycle of the line CCD 116), and the film carrier 38 is set at "v÷1.3" which is the conveying speed of the photographic film 22. The film image of panorama size requires a great enlargement ratio when an image is recorded on a recording material, and therefore, the zoom magnification is set at 1.3 and the conveying speed of the photographic film 22 is set at 1/1.3, which allows the film image of panorama size to be read relatively finely as compared with a film image of normal size.

Further, when the decision of step 468 is no, the process proceeds to step 472 and it is determined whether the type of the film image to be next subjected to fine scan is an "extra high-density frame". When the decision of step 472 is yes, in step 473, the process proceeds to the "fine-scan mode (extra high-density frame)" and each operation of the parts set as the "fine-scan mode (extra high-density frame)" is controlled and the process proceeds to step 478.

Namely, the lamp 32 is turned on, the diaphragm 39 is moved to the position ($P_4$) during fine scan of an extra high-density frame, the turrets 36 and 37 are rotated so that the light controlling filter corresponding to the color balance value of the film image is positioned on the optical path (in Table 1, each position of the turrets 36 and 37 at this time is indicated by "$P_4$" for convenience' sake), the casing 44 and the lens unit 50 are slid so that the zoom magnification by the lens unit 50 becomes 1.0, and the lens stop 51 and the CCD shutter 52 are each moved to the full-open position. Further, the timing generator 74 is set at "4×t" which is the operating time of the electronic shutter of the line CCD 116 (i.e., a reading cycle of the line CCD 116), and the film carrier 38 is set at "v÷4" which is the conveying speed of the photographic film 22. In the case of the film image of extra high density, the amount of light transmitted therethrough is very small, and therefore, the position ($P_4$) of the diaphragm 39 during fine scan of an extra high density frame is set at a substantially full-open position. However, even if the diaphragm 39 is located at the substantially full-open position, the amount of light transmitted is not sufficient. Accordingly, in order that the film image of extra high density be read with high accuracy in a high dynamic range, the operating time of the electronic shutter (i.e., the reading cycle) is multiplied four times and the conveying speed of the photographic film 22 is set at a quarter thereof. The film image of extra high density is thus read at relatively low speed as compared with a film image of normal size.

Further, when the decision of step 472 is no, the process proceeds to step 474 and it is determined whether the type of the film image to be next subjected to fine scan is the "normal density frame". When the decision of step 474 is yes, in step 475, the process proceeds to the "fine-scan mode (normal density frame)", in which each operation of the parts is controlled in accordance with the states of the parts set as the "fine-scan mode (normal density frame)". Subsequently, the process proceeds to step 478.

Namely, the lamp 32 is turned on, the diaphragm 39 is moved to the position ($P_7$) during fine scan of the normal density frame, the turrets 36 and 37 are rotated so that the light controlling filter corresponding to the color balance value of the film image is positioned on the optical path (in Table 1, each position of the turrets 36 and 37 is indicated as "$P_7$" for convenience' sake), the casing 44 and the lens unit 50 are slid so that the zoom magnification by the lens unit 50 becomes 1.0, and the lens stop 51 and the CCD shutter 52 are each moved to the full-open position. Further, the timing generator 74 is set at "t" which is the operating time of the electronic shutter of the line CCD 116 (i.e., a reading cycle of the line CCD 116), and the film carrier 38 is set at "v" which is the conveying speed of the photographic film 22. Meanwhile, the position of the diaphragm 39 ($P_7$) during fine scan of the normal density frame is located correspondingly to the density and is disposed so as to be open as compared with the position of the diaphragm 39 ($P_2$) during fine scan of the low density frame and also disposed so as to be closed as compared with the position of the diaphragm 39 ($P_1$) during fine scan of the high density frame.

Further, when the decision of step 474 is no, it is determined that the film image to be next subjected to fine scan is of normal size and is included in the range of normal density. Accordingly, in step 476, each operation of the parts is controlled so as to allow setting of a normal reading condition, and the process proceeds to step 478.

Meanwhile, the ratio between respective amounts of light of the component colors changes in graded manner due to the rotation of the turrets 36 and 37. Accordingly, in addition to the rotation of the turrets 36 and 37 corresponding to the color balance value, the operating time of the electronic shutter of the line CCD 116 for each of the component colors may be adjusted in accordance with the color balance value. As a result, in the film-image reading by the line CCD 116, an integrated amount of light of each component-color light made incident on the line CCD 116 for each line can be made maximum in the range in which saturation of accumulated charge of the line CCD 116 does not occur, and a film image can be read for each of the component colors in a high dynamic range.

In step 478, it is determined whether, based on the frame position notified from the automatic set-up engine 144, the edge of a film image to be next subjected to fine scan reaches the reading position (i.e., the position on the optical path) of the line CCD 116, and the process is placed in the waiting state until the decision of step 478 is affirmed. When the decision of step 478 is affirmed, the process proceeds to step 480. In step 480, fine scan is effected in such a manner that the film image which has reached the reading position is read by the line CCD 116 and signals outputted from the line CCD 116 are sequentially subjected to A/D conversion and are also sequentially outputted, as fine-scan data, to the image processing section 16. As a result, fine scan of the film image is effected under the reading condition most suitable for each type of film image.

Meanwhile, the fine-scan data outputted from the line CCD scanner 14 to the image processing section 16 is subjected to image processing in the image processor 140 under the processing condition which has been previously calculated (and corrected) in the automatic set-up engine 144, and is further, outputted to the laser printer section 18, or outputted as an image file to the outside, or stored in a hard disk 168.

When fine scan for a single film image is completed, the process proceeds to step 482 and it is determined whether fine scan for all film images recorded on the photographic film 22 to be read has been completed. When the decision of step 482 is no, the process returns to step 460 and steps 460 to 482 are repeated. Steps 460 to 482 correspond to the main-reading control means of the present invention, in which fine scan of each of the film images is effected under the most suitable reading condition corresponding to the type of each film image recorded on the photographic film 22 to be read. When the decision of step 482 is affirmed, the film image reading processing ends and the process proceeds to step 432 of the line-scanner control processing (see FIGS. 11A to 11C).

In step 432, it is determined whether reading of the film image is completed. When a film image recorded on the photographic film 22 to be next subjected is continuously read, the decision of step 432 is no and the process returns to step 428. When the photographic film 22 to be next read is inserted in the film carrier 38 (when the decision of step 428 is affirmed), the film image reading processing is effected in the same manner as described above. Further, when the decision of step 432 is yes, the process returns to step 400 and proceeds to the initial state mode. Thereafter, the above-described steps 402 to 410 are repeated.

As described above, in the present embodiment, the photographic film 22 is conveyed reciprocatively, and when the photographic film 22 is conveyed in the forward direction, pre-scan is effected by a single line CCD 116 without separating into an image section and a non-image section, and the position where a film image is recorded is determined and the reading condition (the type of the film image) is set. Thereafter, when the photographic film 22 is conveyed to return, fine-scan processing for each of the film images is effected in accordance with the above-described reading condition. For this reason, it is possible to prevent an increase in cost caused by providing a sensor and an optical system which are used for pre-scan processing, and a sensor and an optical system which are used for fine-scan processing, and also prevent complication of the structure of the apparatus caused by providing a film buffer used for eliminating the difference in conveying speed between pre-scan processing and fine-scan processing. Further, a small-sized line CCD scanner 14, simplification of the structure thereof, and reduction in cost thereof can be realized.

The diaphragm 39 is not limited to the plate material shown in FIG. 4B having the notch 39A formed therein. For example, as shown in FIG. 4D, the diaphragm 39 may be formed by a plate material 67 in which a light-transmittance pattern is formed so that the light transmittance continuously changes from one end to the other end of the plate material in the direction in which the plate member slides. Alternatively, as shown in FIG. 4E, the diaphragm 39 may also be formed by a plate material 68 having no light transmittance.

Further, in the foregoing, the amount of light for each of the component colors is adjusted by the diaphragm 39 and the turrets 36 and 37. However, the present invention is not limited to the same. For example, there may also be used the structure in which a light controlling filter is provided for each of the component colors, a mechanism for causing each light controlling filter to advance on and retreat from the optical path is provided for each of the light controlling filters, and the amount by each of the light controlling filters is inserted into the optical path is controlled independently.

Figure 17A:
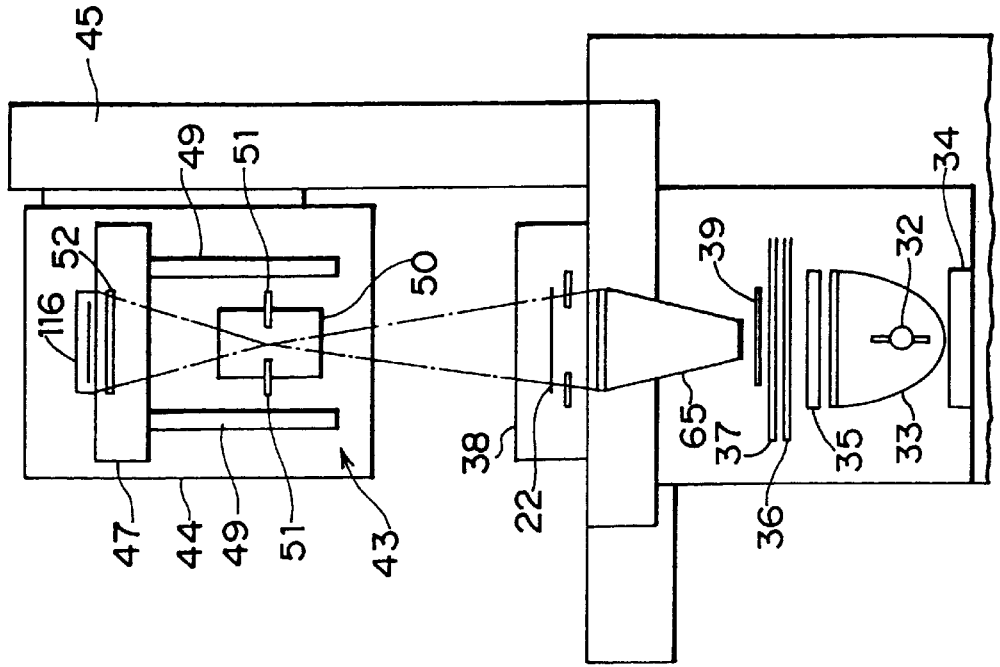
FIG. 17A is a front view which schematically shows another example of the structure of the optical system of the line CCD scanner.
Figure 17B:
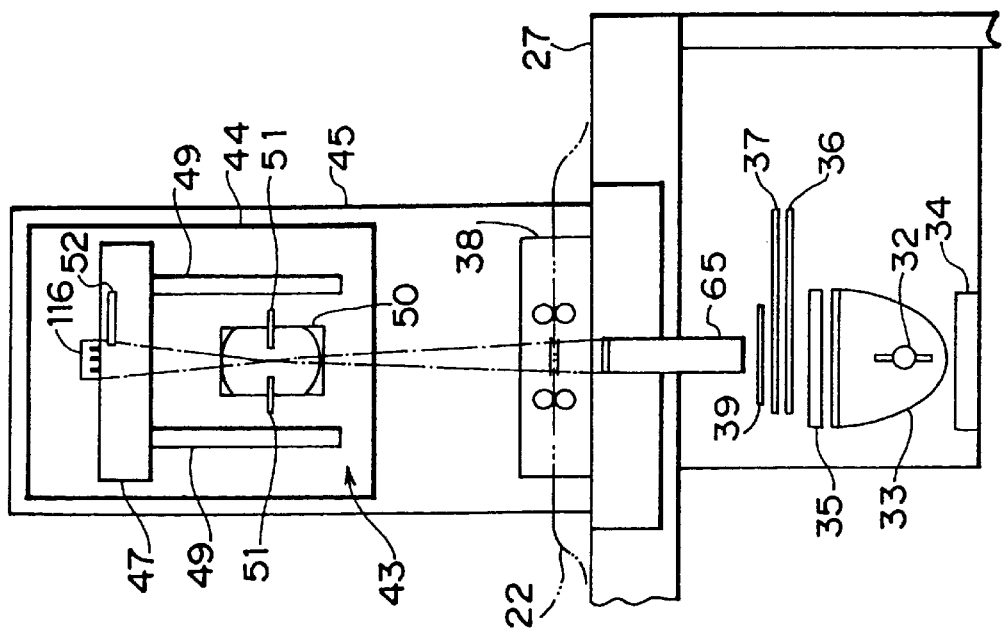
FIG. 17B is a side view which schematically shows another example of the structure of the optical system of the line CCD scanner.

Moreover, in the foregoing, the lamp 32 is disposed by the side of the position directly below the reading position in such a manner as to face horizontally, and the light diffusion box 40 of which intermediate portion is bent perpendicularly causes light emitted from the lamp 32 to be led to the reading position and also to be irradiated on the photographic film 22. However, for example, as shown in FIG. 16, there may be used, in place of the light diffusion box 40, a light conducting device in which a large number of light fibers are formed into a bundle, and an intermediate portion thereof is gradually bent, and a light incidence opening thereof is made circular, and further, a light exit opening thereof is formed into a flat rectangle. In this case, so long as a light diffusion plate is mounted at at least one of the light incidence opening and the light exit opening, this structure can be used as the light diffusion means according to the present invention. Further, as shown in FIGS. 17A and 17B, there may be used the structure in which the lamp 32 serving as the light source is disposed directly below the reading position and a light diffusion box 65 of which intermediate portion is not bent is used as the light diffusion means.

In addition, there was described, as an example of the conveying means, the film carrier 38 which is structured to nip and convey the photographic film 22 by the conveying roller pairs 318 and 322, but the present invention is not limited to the same. For example, there may be used the structure in which the photographic film 22 is nipped by an endless belt and is conveyed by the endless belt being driven rotatively.

In the foregoing, there was described the case in which the photographic film 22 is conveyed to make one reciprocation, and when the film is conveyed in the forward direction, pre-scan is effected, and when the film is conveyed back, fine scan is effected. However, the present invention is not limited to the same. The system may also be used in which the photographic film is conveyed reciprocatively a number of times, pre-scan and fine scan are each effected when the film is conveyed in the forward direction of each lap, or pre-scan and fine scan are each effected when the film is conveyed back in each lap, or pre-scan is effected when the film is conveyed in the forward direction and fine-scan is effected when the film is conveyed back.

Further, in the reading operation of the film image, the amount of charge accumulated in the line CCD 116 is adjusted in such a manner as to change the position of the diaphragm 39 and the time in which charge is accumulated in the line CCD 116 (i.e., the operating time of the electronic shutter). However, the present invention is not limited to the same. For example, the adjustment of the amount of charge accumulated may be achieved by varying the amount of light emitted from the lamp 32 due to a variation of a voltage supplied for the lamp 32 or a variation of duty ratio when the lamp 32 is turned on by supply of high-frequency power, by changing the position of the lens stop 51, or by using a combination thereof.

Moreover, in the foregoing, the reading resolution is changed by a combination of variations of the zoom magnification of the lens unit 50 and the conveying speed of the photographic film 22 (in the above-described embodiment, the resolution of a panorama frame is changed). However, the present invention is not limited to the same. For example, in place of the variation of the conveying speed, the time in which charge is accumulated in the line CCD 116 may be changed, or image processing of electronic variable power (conversion of the resolution) may be effected for image data obtained by reading processing.

As described above, the first aspect of the present invention is structured to include light controlling means which can control an amount of light emitted from a light source for each light of the component colors; light diffusion means which diffuses light emitted from the light source; conveying means which rotatively drives a pair of rollers or belts, by which an elongated photographic film with an image recorded is nipped, and thereby conveys the photographic film at a predetermined conveying speed along a conveying path which crosses an optical path of the light emitted from said light source; a line sensor which allows reading of the image by separating the image into component colors; and control means which controls so that preliminary reading for the image recorded on the photographic film is effected under a predetermined reading condition, and thereafter, controls so that main reading for the image is effected under a reading condition set up on the basis of the result of the preliminary reading. Accordingly, the present invention has an excellent effect in that reading of the film image recorded on the photographic film for each light of the component colors with accuracy and at high speed can be achieved by using a simple and low-cost structure.

Further, the second aspect of the present invention is structured to provide a light source section which can adjust an amount of light emitted therefrom for each of light of component colors; conveying means which rotatively drives rollers or belts, by which a photographic film is nipped, and thereby conveys the photographic film; a line sensor which allows reading of the photographic film by separating the photographic film into component colors, and is also structured in such a manner that preliminary reading which allows reading without separating into an image portion and a non-image portion on the photographic film is effected under a predetermined reading condition, and based on a result of the preliminary reading, a recorded position of each image on the photographic film is determined and a reading condition during main reading for each of images is set, and further, main reading is effected which allows reading of each image recorded on the photographic film under the set reading condition. Accordingly, the present invention has an excellent effect in that reading of the film image recorded on the photographic film for each of light of component colors with accuracy and at high speed can be achieved by using a simple and low-cost structure.

The third aspect of the present invention is structured in such a manner that, in the second aspect, data of each image is cut out from the result of the preliminary reading, each image is displayed on the display means by using the cut-out data, and when the information which corrects the cut-out position of the image is inputted by said input means, the result of the determination of the recorded position of each image on the photographic film is corrected based on the inputted information. Accordingly, in addition to the above-described effect, the present invention has an effect in that during the main reading of an image, the position where the image is actually recorded on the photographic film can be reliably read.

The fourth aspect of the present invention is structured in such a manner that, in the second aspect, a processing condition of image processing for a result of the main reading of each image is calculated for each image, and when image processing is effected for the result of the main reading of each image in accordance with the calculated processing condition, an image which corresponds to a result of image processing for each image under the calculated processing condition is displayed on the display means, and when information which corrects the processing condition is inputted, the processing condition is corrected based on the inputted information. Accordingly, in addition to the above-described effect, the present invention has an effect in that image processing can be effected for the result of the main reading of the image constantly under the proper processing condition.

What is claimed is:

1. An image reading apparatus comprising:

a light source;

light controlling means which can control an amount of light emitted from said light source for each light of component colors;

light diffusion means which diffuses light emitted from said light source;

conveying means which rotatively drives at least one pair of rollers or belts, by which an elongated photographic film with an image recorded is nipped, and thereby conveys the photographic film at a predetermined conveying speed along a conveying path which crosses the optical path of the light emitted from said light source;

imaging means on which light transmitted through the photographic film is made incident so as to allow imaging of the image recorded on the photographic film;

a line sensor on which light transmitted through said imaging means is made incident and which allows reading of the image by separating the image into component colors; and control means which controls at least said light controlling means, said conveying means, and said line sensor so that preliminary reading for the image recorded on the photographic film is effected under a predetermined reading condition, and thereafter, controls at least said light controlling means, said conveying means, and said line sensor so that main reading for the image is effected under a reading condition set up on the basis of the result of the preliminary reading.

2. An image reading apparatus according to claim 1, wherein said light controlling means includes:

a turret on which a plurality of filters having different respective rates of decrease of light for light of a specified component color are mounted, any one of the plurality of filters being positioned on an optical path of light emitted from said light source; and a diaphragm which adjusts the amount of light emitted from said light source.

3. An image reading apparatus according to claim 1, wherein said line sensor is a three-line color CCD sensor.

4. An image reading apparatus according to claim 1, wherein said light diffusion means is a substantially L-shaped light diffusion box of which the intermediate portion is bent at a right angle and the light diffusion box has a flat rectangle-shaped light exit opening of which the longitudinal direction coincides with the transverse direction of the photographic film conveyed by said conveying means, the dimension of the light diffusion box along the transverse direction of the photographic film being provided to be gradually increased in a tapered manner from the bent portion to the light exit opening.

5. An image reading apparatus according to claim 1, wherein said light diffusion means further includes:

a light conducting device in which a large number of optical fibers are made into a bundle and an intermediate portion thereof is gradually bent, a light incidence opening and a light exit opening of the light conducting device being respectively made circular and flat rectangular; and a light diffusion plate mounted on at least one of the light incidence opening and the light exit opening of said light conducting device.

6. An image reading apparatus according to claim 2, wherein said diaphragm is formed from a pair of plate materials disposed with an optical axis interposed therebetween and which can slide toward and away from each other, and the plate materials each have notches on one side so that the cross-sectional area thereof in the direction perpendicular to the direction in which the plate materials slide varies continuously from one side to the other side in the sliding direction, and are disposed so that the sides of the plate materials with the notches formed thereon face each other.

7. An image reading apparatus according to claim 2, wherein said diaphragm is formed from a pair of plate materials disposed with an optical axis interposed therebetween and which can slide toward and away from each other and the plate materials each have a light transmitting pattern so that light transmittance continuously varies from one side to the other side in the direction in which the plate materials slide.

8. An image reading apparatus according to claim 2, wherein said diaphragm is formed from a pair of plate materials disposed with an optical axis interposed therebetween and which can slide toward and away from each other and the plate materials have no light transmitting capability.

9. An image reading apparatus comprising:

a light source section which can adjust an amount of light emitted therefrom for each light of the component colors;

conveying means which rotatively drives at least one pair of rollers or belts, by which an elongated photographic film with an image recorded is nipped, and thereby conveys the photographic film at a predetermined conveying speed along a conveying path which crosses the optical path of the light emitted from said light source;

imaging means on which light transmitted through the photographic film is made incident so as to allow imaging of the image recorded on the photographic film;

a line sensor on which light transmitted through said imaging means is made incident and which allows reading of the photographic film by separating the photographic film into component colors;

preliminary-reading control means which controls at least said light source section, said conveying means, and said line sensor so that preliminary reading which allows reading without separating into an image portion and a non-image portion on the photographic film is effected under a predetermined reading condition;

determination means for determining a recorded position of each image on the photographic film based on a result of the preliminary reading;

reading-condition setting means for setting a reading condition during main reading for each of images based on the result of the preliminary reading and a result of the determination of the recorded position of each image on the photographic film; and main-reading control means which controls, based on the result of the determination of the recorded position of each image on the photographic film, at least said light source section, said conveying means, and said line sensor so that main reading is effected which allows reading of each image recorded on the photographic film under the reading condition set by said reading-condition setting means.

10. An image reading apparatus according to claim 9, further comprising:

display means which displays an image;

cut-out means which cuts out data of each image from the result of the preliminary reading based on the result of the determination of the recorded position of each image on the photographic film;

display control means which allows each image to be displayed on said display means by using data cut out by said cut-out means; and input means for inputting information which corrects a cut-out position of the image, wherein said determination means corrects, based on the inputted information, the result of the determination of the recorded position of each image on the photographic film when the information which corrects the cut-out position of the image is inputted by said input means.

11. An image reading apparatus according to claim 10, further comprising:

processing-condition calculating means which calculates, for each of images, a processing condition of image processing for a result of the main reading of each image based on data cut out by said cut-out means; and image processing means which effects image processing for the result of the main reading of each image in accordance with the processing condition calculated by said processing-condition calculating means, wherein said display control means uses the data cut out by said cut-out means to allow an image, which corresponds to a result of image processing for each image under the processing condition calculated by said processing-condition calculating means, to be displayed on said display means, and said processing-condition calculating means corrects, when information which corrects the processing condition is inputted by said input means, the processing condition based on the inputted information.

12. An image reading apparatus according to claim 9, wherein said light source section includes:

a light source;

light controlling means which can control an amount of light emitted from said light source for each light of the component colors; and light diffusion means which diffuses the light emitted from said light source.

13. An image reading apparatus according to claim 9, wherein said line sensor is a three-line color CCD sensor.

14. An image reading apparatus according to claim 12, wherein said light controlling means includes:

a turret on which a plurality of filters having different respective rates of decrease of light for light of a specified component color are mounted, any one of the plurality of filters being positioned on the optical path of light emitted from said light source; and a diaphragm which adjusts the amount of light emitted from said light source.

15. An image reading apparatus according to claim 12, wherein said light diffusion means is a substantially L-shaped light diffusion box of which the intermediate portion is bent at a right angle and the light diffusion box has a flat rectangle-shaped light exit opening of which the longitudinal direction coincides with the transverse direction of the photographic film conveyed by said conveying means, the dimension of the light diffusion box along the transverse direction of the photographic film being provided to be gradually increased in a tapered manner from the bent portion to the light exit opening.

16. An image reading apparatus according to claim 12, wherein said light diffusion means further includes:

a light conducting device in which a large number of optical fibers are made into a bundle and an intermediate portion thereof is gradually bent, a light incidence opening and a light exit opening of the light conducting device being respectively made circular and flat rectangular; and a light diffusion plate mounted on at least one of the light incidence opening and the light exit opening of said light conducting device.

17. An image reading apparatus according to claim 14, wherein said diaphragm is formed from a pair of plate materials disposed with an optical axis interposed therebetween and which can slide toward and away from each other, and the plate materials each have notches on one side so that the cross-sectional area thereof in the direction perpendicular to the direction in which the plate materials slide varies continuously from one side to the other side in the sliding direction, and are disposed so that the sides of the plate materials with the notches formed thereon face each other.

18. An image reading apparatus according to claim 14, wherein said diaphragm is formed from a pair of plate materials which is disposed with an optical axis interposed therebetween and which can slide toward and away from each other and the plate materials each have a light transmitting pattern so that light transmittance continuously varies from one side to the other side in the direction in which the plate materials slide.

19. An image reading apparatus according to claim 14, wherein said diaphragm is formed from a pair of plate materials which is disposed with an optical axis interposed therebetween and which can slide toward and away from each other and the plate materials have no light transmitting capability.

* * * * *